United States Patent
Rossbach et al.

(10) Patent No.: US 9,424,079 B2
(45) Date of Patent: Aug. 23, 2016

(54) ITERATION SUPPORT IN A HETEROGENEOUS DATAFLOW ENGINE

(71) Applicant: Microsoft Technology Licensing, LLC, Redmond, WA (US)

(72) Inventors: Christopher John Rossbach, Menlo Park, CA (US); Jonathan J. Currey, Belmont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 13/929,762

(22) Filed: Jun. 27, 2013

(65) Prior Publication Data
US 2015/0007182 A1 Jan. 1, 2015

(51) Int. Cl.
*G06F 9/48* (2006.01)

(52) U.S. Cl.
CPC .................... *G06F 9/4843* (2013.01)

(58) Field of Classification Search
CPC ........................................... G06F 9/46
USPC ........................................ 718/102
See application file for complete search history.

(56) References Cited

U.S. PATENT DOCUMENTS

| | | | |
|---|---|---|---|
| 6,269,390 B1 | 7/2001 | Boland | |
| 7,598,953 B2 | 10/2009 | Tarditi, Jr. et al. | |
| 7,659,901 B2 | 2/2010 | Toelle et al. | |
| 7,689,582 B2 | 3/2010 | Behnen et al. | |
| 8,250,548 B2 | 8/2012 | Kasahara et al. | |
| 2002/0129173 A1* | 9/2002 | Weber et al. | 709/310 |
| 2003/0172104 A1* | 9/2003 | Hooman et al. | 709/103 |
| 2004/0160446 A1 | 8/2004 | Gosalia et al. | |
| 2006/0149817 A1* | 7/2006 | Bou-Ghannam et al. | 709/206 |
| 2006/0271606 A1 | 11/2006 | Tewksbary | |
| 2007/0150877 A1* | 6/2007 | Emmett et al. | 717/149 |
| 2008/0276064 A1 | 11/2008 | Munshi et al. | |
| 2009/0007127 A1 | 1/2009 | Roberts et al. | |
| 2009/0307699 A1 | 12/2009 | Munshi et al. | |
| 2010/0122066 A1* | 5/2010 | Fischer | 712/205 |
| 2010/0211760 A1 | 8/2010 | Bernhard et al. | |
| 2010/0214301 A1 | 8/2010 | Li et al. | |

(Continued)

OTHER PUBLICATIONS

Baumann, et al., "The Multikernel: A new OS architecture for scalable multicore systems", retrieved at <<http://www.sigops.org/sosp/sosp09/papers/baumann-sos09.pdf>>, 22nd Symposium on Operating System Principles, Oct. 2008, pp. 1-20.

(Continued)

*Primary Examiner* — Emerson Puente
*Assistant Examiner* — Charlie Sun
(74) *Attorney, Agent, or Firm* — Sandy Swain; Micky Minhas; Lee & Hayes, pllc.

(57) ABSTRACT

Various embodiments provide techniques and constructs to improve execution speed of distributed iterative computation using heterogeneous specialized resources including, for example, processors and accelerators. Iteration over an arbitrary sub-graph without loop unrolling including for algorithms with data-dependent loop termination and large iteration counts, including as a result of nested iteration, are supported in a resource-efficient manner without adding vertices to a dataflow graph to represent iteration constructs. Instead, some or all of the existing vertices within the sub-graph that is to be iterated upon based on having additional and/or modified ports and channels associated with them.

20 Claims, 30 Drawing Sheets

(56) References Cited

U.S. PATENT DOCUMENTS

| | | | |
|---|---|---|---|
| 2010/0257538 A1 | 10/2010 | Zhao et al. | |
| 2011/0047534 A1* | 2/2011 | Ye et al. | 717/160 |
| 2011/0050713 A1 | 3/2011 | McCrary et al. | |
| 2011/0115802 A1 | 5/2011 | Mantor et al. | |
| 2011/0141122 A1 | 6/2011 | Hakura et al. | |
| 2011/0161962 A1* | 6/2011 | Laksberg et al. | 718/102 |
| 2011/0285729 A1 | 11/2011 | Munshi et al. | |
| 2012/0266182 A1* | 10/2012 | Brazier | 718/106 |
| 2013/0232495 A1 | 9/2013 | Rossbach et al. | |
| 2013/0346988 A1* | 12/2013 | Bruno et al. | 718/102 |
| 2014/0055347 A1* | 2/2014 | Taylor et al. | 345/156 |

OTHER PUBLICATIONS

Currid, Andy "TCP Offload to the Rescue", retrieved at <<http://portal.acm.org/ft_gateway.cfm?id=1005069&type=pdf>>, ACM Queue, vol. 02, No. 3, May 2004, pp. 58-65.

Gupta et al., "Pegasus: Coordinated Scheduling for Virtualized Accellerator-based Systems", retrieved at <<http://www.usenix.org/event/atc11/tech/final_files/Gupta.pdf>>, In Proceedings of the 2011 Usenix Annual Technical Conference, Jun. 2011, pp. 14.

Isard, et al., "Dryad: Distributed Data-Parallel Programs from Sequential Building Blocks", retrieved at <<http://research.microsoft.com/en-us/projects/dryad/eurosys07.pdf>> European Conference on Computer Systems (EuroSys) <arch 21-23,2007, pp. 14.

Kato, et al., RGEM: A Responsive GPGPU Execution Model for Runtime Engines, retrieved at <<htt://www.contrib.andrew.cmu.edu/~ shinpei/papers/rtss11.pdf>>, retrieved dated: Oct. 28, 2011, pp. 10.

Kato, et al., "TimeGraph: GPU Scheduling for Real-Time Multi-Tasking Environments" retrieved at <<http://static.useix.org/event/atc11/tech/final_filed/Kato.pdf>>, In Proceedings of the 2011 USENIX Annual Technical Conference (USENIX ATX), 2011, pp. 14.

Massalin, et al., "Threads and Input/Output in the Synthesis Kernel", retrieved at <<http://www.cs.princeton.edu/courses/archive/fall03/cs518/papers/synthesis.pdf>>, in proceedings of the 12th ACM Symposium on Operating Systems Principles, 1989, pp. 191-201.

Nightingale, et al., "Helios: Heterogeneous Multiprocessing with Satellite Kernels", retrieved at <<http://citeseerx.ist.psu.edu/viewdoc/download?doi=10.1.1.1496781&rep=rep1&type=pdf>>, Proceedings of the 22nd ACM Symposium on Operating Systems Principles, SOSP, Oct. 11-14, 2009, pp. 14.

Papadopoulos, et al., "Monsoon: An Explicit Token-Store Architecture", retrieved at <<http://citeseerx.ist.psu.edu/viewdoc/download?doi=10.1.1.124.1645&rep1&type=pdf>>, In Proceedings of the 17th Annual International Symposium on Computer Architecture, 1990, pp. 82-91.

Rossbach et al., "Operating Systems must support GPU abstractions", retrieved at <<http://usenix.org/events/hotos/tech/final_files/Rossbach.pdf>>, HotOS, May 9-11, pp. 1-5.

Thies, et al. Streamlt: A Language for Streaming Applications:, retrieved at <<http://people.csail.mit.edu/thies/streamit-cc.pdf>>, Compiler Construction, 11th International Conference, CC, Held as Part of the Joint European Conferences on Theory and Practice of Software, ETAPS, Apr. 8-12, 2002. pp. 1-17.

Weinsberg, et al. "Tapping into the Fountain of CPUs—On Operating System Support for Programmable Devices" retrieved at <<http://www.cs.huji.ac.il/~dolev/pubs/aspolos08-yaron--selfcopy.pdf>>, Proceedings of the 13th International Converence on Architectural Support for Programming Languages and Operating Systems, ASPLOS, Mar. 1,5, 2008, pp. 10.

Arvind et al., "Executing a Program on the MIT Tagged-Token Dataflow Architecture", IEEE Transactions on Computers, vol. 39, No. 3, Mar. 1990, pp. 300-318.

Arvind et al., "Indeterminancy, Monitors, and Dataflow", Proceedings of the Sixth aCM Symposium on Operating Systems Principles, Nov. 1977, pp. 159-169.

Arvind, et al., "The U-Interpreter", retrieved on Mar. 7, 2013 at <<http://ieeexplore.ieee.org/stamp/stamp.jsp?arnumber=01653940>>, IEEE Computer Society Press, Computer (Journal), vol. 15, No. 2, Feb. 1982, pp. 42-49.

Auerback et al., "Lime: a JavaCompatible and Synthesizable Language for Heterogeneous Architectures", OOPSLA/SPLASH, Oct. 17-21, 2010, 20 pages.

Augonnet, et al., "A Unified Runtime System for Heterogeneous Multi-core Architectures", retrieved on Mar. 7, 2013 at <<http://citeseerx.ist.psu.edu/viewdoc/download?doi=10.1.1.232.5839&rep=rep1&type=pdf>>, Proceedings of Workshop on Highly Parallel Processing on a Chip (Euro-Par Workshops), Aug. 26, 2008, pp. 174-183.

Baker, et al., "A Database and Evaluation Methodology for Optical Flow", retrieved on Mar. 7, 2013 at <<http://www.scribblethink.org/Work/Pdfs/ijcv.pdf>>, Intl Journal of Computer Vision, vol. 92, No. 1, Mar. 2011, pp. 1-31; published online Nov. 30, 2010.

Baker, et al., "Removing Rolling Shutter Wobble", retrieved on Mar. 7, 2013 at <<http://ieeexplore.ieee.org/stamp/stamp.jsp?tp=&arnumber=5539932>>, Proceedings of IEEE Conference on Computer Vision and Pattern Recognition (CVPR), Jun. 13, 2010, pp. 2392-2399.

Bu, et al., "HaLoop: Ef?cient Iterative Data Processing on Large Clusters", retrieved on Mar. 7, 2013 at <<http://www.ics.uci.edu/~yingyib/papers/HaLoop_camera_ready.pdf>>, Proceedings of Intl Conference on Very Large Data Bases (VLDB Endowment Journal), vol. 3, No. 1-2, Sep. 2010, pp. 285-296.

Catanzaro, et al., "A Map Reduce Framework for Programming Graphics Processors", retrieved on Mar. 7, 2013 at <<http://www.cs.berkeley.edu/~narayans/Publications_files/stmcs2008.pdf>>, Proceeding of Workshop on Software Tools for MultiCore Systems (STMCS), Apr. 2008, 6 pages.

Cooper, et al., "Iterative Dataflow Analysis, Revisited", retrieved on Mar. 7, 2013 at <<http://www.cs.rice.edu/~harv/my_papers/worklist.pdf>>, Proceedings of Programming Language Design and Implementation (PLDI), Rice Technical Report TR04-100, Nov. 2002, 11 pages.

Davis, et al., "Data Flow Program Graphs", retrieved on Mar. 7, 2013 at <<http://ieeexplore.ieee.org/stamp/stamp.jsp?tp=&arnumber=1653939>>, IEEE Computer Society Press, Computer (Journal), vol. 15, No. 2, Feb. 1982, pp. 26-41.

Dean, et al., "MapReduce: Simplified Data Processing on Large Clusters", retrieved on Mar. 7, 2013 at <<http://feedblog.org/wp-content/uploads/2008/01/p107-dean.pdf>>, Communications of the ACM (Journal), vol. 51, No. 1, Jan. 2008, pp. 107-113.

Dennis, et al., "A Preliminary Architecture for a Basic Data-Flow Processor", retrieved on Mar. 7, 2013 at <<http://citeseerx.ist.psu.edu/viewdoc/download?doi=10.1.1.110.3467&rep=rep1&type=pdf>>, Proceedings of Symposium on Computer Architecture, Dec. 1974, pp. 126-132.

Ekanayake, et al., "Twister: A Runtime for Iterative MapReduce", retrieved on Mar. 7, 2013 at <<http://www.iterativemapreduce.org/hpdc-camera-ready-submission.pdf>>, Proceedings of ACM Intl Symposium on High Performance Distributed Computing (HPDC), Jan. 2010, pp. 810-818.

Ewen, et al., "Spinning Fast Iterative Data Flows", retrieved on Mar. 7, 2013 at <<http://www.user.tu-berlin.de/kostas.tzoumas/papers/iterative.pdf>>, Proceedings of Intl Conference on Very Large Data Bases (VLDB Endowment Journal), vol. 5, No. 11, Jul. 2012, pp. 1268-1279.

Halbwachs, et al., "The Synchronous Data Flow Programming Language LUSTRE", retrieved on Mar. 7, 2013 at <<http://ieeexplore.ieee.org/stamp/stamp.jsp?tp=&arnumber=97300>>, Proceedings of the IEEE, vol. 79, No. 9, Sep. 1991, pp. 1305-1320.

He, et al., "Mars: A MapReduce Framework on Graphics Processors", retrieved on Mar. 7, 2013 at <<http://www.ece.rutgers.edu/~parashar/Classes/08-09/ece572/readings/mars-pact-08.pdf>>, Proceedings of Intl Conference on Parallel Architectures and Compilation Techniques (PACT), Oct. 25, 2008, pp. 260-269.

"High Performance Computing (HPC) on AWS", retrieved on Mar. 7, 2013 at <<http://aws.amazon.com/hpc-applications/>>, Amazon Web Services, 2013, 3 pages.

Hormati, et al., "Flextream: Adaptive Compilation of Streaming Applications for Heterogeneous Architectures", retrieved on Mar. 7, 2013 at <<http://research.microsoft.com/pubs/157140/pact09.

(56) References Cited

OTHER PUBLICATIONS pdf>>, Proceedings of Intl Conference on Parallel Architectures and Compilation Techniques (PACT), Sep. 12, 2009, pp. 214-223.

Hormati, et al., "Sponge: Portable Stream Programming on Graphics Engines", retrieved on Mar. 7, 2013 at <<http://web.eecs.umich.edu/~tnm/trev_test/papersPDF/2011.3.Sponge%20Portable%20Stream%20Programming.pdf>>, Proceedings of Intl Conference on Architectural Support for Programming Languages and Operating Systems (APLOS), Mar. 5, 2011, pp. 381-392.

Horn, et al., "Determining Optical Flow", retrieved on Mar. 7, 2013 at <<http://patrec.cs.tu-dortmund.de/lectures/SS12/computervision/Horn81-DOF.pdf>>, Artificial Intelligence (Journal), vol. 17, No. 1-3. Aug. 1981, pp. 185-203.

Isard, et al., "Dryad: Distributed Data-Parallel Programs from Sequential Building Blocks", retrieved on Mar. 7, 2013 at <<http://www.cs.cmu.edu/~./15712/papers/isard07.pdf>>, Proceedings of ACM European Conference on Computer Systems (EuroSys), Mar. 21, 2007, pp. 59-72.

Jiang, et al., "MATE-CG: A MapReduce-Like Framework for Accelerating Data-Intensive Computations on Heterogeneous Clusters", retrieved on May 7, 2013 at <<http://ieeexplore.ieee.org/stamp/stamp.jsp?tp=&arnumber=6267866>>, Proceedings of IEEE Intl Parallel and Distributed Processing Symposium (IPDPS), May 21, 2012, pp. 644-655.

Lee, et al., "Static Scheduling of Synchronous Data Flow Programs for Digital Signal Processing", retrieved on Mar. 7, 2013 at <<http://ieeexplorejeee.org/stamp/stamp.jsp?tp=&arnumber=5009446>>, IEEE Transactions on Computers, vol. C-36, No. 1, Jan. 1987, pp. 24-35.

Malewicz, et al., "Pregel: A System for Large-Scale Graph Processing", retrieved on Mar. 7, 2013 at <<http://people.apache.org/~tjungblut/downloads/pregel_paper.pdf>>, Proceedings of ACM Intl Conference on Management of Data (SIGMOD), Jun. 6, 2010, pp. 135-146.

McSherry, et al., "Composable Incremental and Iterative Data-Parallel Computation with Naiad", retrieved on Mar. 7, 2013 at <<http://research.microsoft.com/pubs/174076/naiad.pdf>>, Microsoft Corporation, Microsoft Research Technical Report MSR-TR-2012-105, Oct. 9, 2012, 20 pages.

Mihaylov, et al., "REX: Recursive, Delta-Based Data-Centric Computation", retrieved on Mar. 7, 2013 at <<http://vldb.org/pvldb/vol5/p1280_svilenrmihaylov_vldb2012.pdf>>, Proceedings of Intl Conference on Very Large Data Bases (VLDB Endowment Journal), vol. 5, No. 11, Aug. 27, 2012, pp. 1280-1291.

Murray, et al., "CIEL: A Universal Execution Engine for Distributed Data-flow Computing", retrieved on Mar. 7, 2013 at <<http://static.usenix.org/event/nsdi11/tech/full_papers/Murray.pdf>>, USENIX, Proceedings of Conference on Networked Systems Design and Implementation (NSDI), Mar. 30 2011, 14 pages.

Nielson, et al., "Finiteness Conditions for Fixed Point Iteration", retrieved on Mar. 7, 2013 at <<http://3e8.org/pub/scheme/doc/lisp-pointers/v5i1/p96-nielson.pdf>>, Proceeding of ACM Symposium on Lisp and Functional Programming (LISP), Jan. 1992, pp. 96-108.

"NVIDIA CUDA C Programming Guide, version 4.1", retrieved on Mar. 7, 2013 at <<http://www.cs.swartmore.edu/~newhall/CUDA_C_Programming_Guide-2.pdf>>, NVIDIA Corporation, Nov. 18, 2011, 171 pages.

Ravi, et al., "Scheduling Concurrent Applications on a Cluster of CPU-GPU Nodes", retrieved on Mar. 7, 2013 at <<http://ieeexplore.ieee.org/stamp/stamp.jsp?tp=&arnumber=6217415>>, Proceedings of IEEE/ACM Intl Symposium on Cluster, Cloud and Grid Computing (CCGRID), May 13, 2012, pp. 140-147.

Reps, et al., "Precise Interprocedural Dataflow Analysis via Graph Reachability", retrieved on Mar. 7, 2013 at <<http://cs.sookmyung.ac.kr/~chang/lecture/popa/oppl95.pdf>>, Proceedings of ACM Symposium on Principles of Programming Languages, Jan. 23, 1995, pp. 49-61.

Rossbach, et al., "PTask: Operating System Abstractions to Manage GPUs as Compute Devices", retrieved on Mar. 7, 2013 at <<http://www.cs.utexas.edu/users/witchel/pubs/sosp11rossbach-ptask.pdf>>, Proceedings of ACM Symposium on Operating Systems Principles (SOSP), Oct. 23, 2011, pp. 233-248.

Sbirlea, et al., "Mapping a Data-Flow Programming Model onto Heterogeneous Platforms", retrieved on Mar. 7, 2013 at <<http://cadlab.cs.ucla.edu/~cong/papers/lctes12.pdf>>, Proceedings of ACM Intl Conference on Languages, Compilers, Tools and Theory for Embedded Systems (LCTES), Jun. 12, 2012, pp. 61-70.

Thies, et al., "Streamlt: A Language for Streaming Applications", retrieved on Mar. 7, 2013 at <<http://www.cs.washington.edu/research/vlsi/bibliography/Streams/Streamit_ICCC_2002.pdf>>, Proceedings of Intl Conference on Compiler Construction (ICCC), Apr. 8, 2002, pp. 179-196.

"Top 500 Supercomputer Sites", retrieved on Mar. 7, 2013 at <<http://www.top500.org/>>, 2013, 2 pages.

Ueno et al., "Highly Scalable Graph Search for the Graph500 Benchmark", HPDC, Jun. 18-22, 2012, 12 pages.

\* cited by examiner

| FIG. 6A | FIG. 6B | FIG. 6C | FIG. 6D | FIG. 6E | FIG. 6F | FIG. 6G |
|---------|---------|---------|---------|---------|---------|---------|
| FIG. 6H | FIG. 6I | FIG. 6J | FIG. 6K | FIG. 6L | FIG. 6M | FIG. 6N |
| FIG. 6O | FIG. 6P | FIG. 6Q | FIG. 6R | FIG. 6S | FIG. 6T | FIG. 6U |

FIG. 6

ITERATION SUPPORT IN A HETEROGENEOUS DATAFLOW ENGINE

RELATED APPLICATION

This application is related to and incorporates by reference co-pending and commonly assigned Ser. No. 13/409,117, entitled "Scheduling Accelerator Tasks On Accelerators Using Graphs," which was filed on Mar. 1, 2012.

BACKGROUND

Current dataflow frameworks express linear output of data from one process feeding into another process. Most dataflow computations are acyclic, meaning that the operators are sequenced in a linear order so that the inputs of each operator come from the outputs of "previous" operators. Running the operators in the linear order ensures all operators have input available. In previous implementations designed for Directed Acyclic Graphs, (DAGs), iteration of a sub-graph is conventionally achieved by repeating that sub-graph, once per iteration count ('loop unrolling'). In loop unrolling implementations, the graph is static and constructed in advance of compute time. Hence the number of iterations is static and DAGs cannot support iteration loops that terminate based on a data-dependent termination-criterion being met. Moreover, graph size grows with the number of iterations. For nested iteration (i.e., loops within loops), the growth in graph size is proportional to the product of the loop lengths (i.e., the number of graph vertices in each loop scope).

Cyclic, or iterative, graphs on the other hand, typically require problem-dependent knowledge to schedule because the vertices may not be ordered, and inputs may not be fully formed before the operator runs.

When it comes to heterogeneous systems, that is systems having a variety of processors and hardware logic, currently, a programmer has to write extra code in order for a process on an accelerator device such as a graphics processing unit (GPU) or a field programmable gate array (FPGA) to accept data output from a second device such as a computer processing unit (CPU) or a different GPU or FPGA. Often, writing code for memory synchronization and communication monopolizes the time of the programmer, without contributing to the kind of computation that the programmer is seeking to express. In addition to monopolizing the time of the programmer, if less well written or not well-maintained when the dataflow graph is modified, this synchronization and communication code can cause bugs or performance degradation.

Programming systems for GPUs typically rely on vendor-provided tools that require programmers to write code that explicitly controls the movement of data to and from the GPU, which is time consuming and error prone. This is in addition to the programmers writing the code that runs on the GPU itself to accomplish the task for which the programmer chose the GPU.

Because existing dataflow systems rely on explicit control, programmers using these systems sacrifice performance, modularity, and reusability. Thus, coupling dataflow code with algorithm code presents a barrier to providing higher-level programming environments for programming GPUs and other accelerators. Existing dataflow execution engines such as MAPREDUCE, DryadLINQ, and PTask sacrifice flexibility for simplicity, making iteration and recursion difficult to express and support.

Conventional dataflow systems, with an objective to design an instruction set that will execute on a homogeneous processor architecture specifically designed for dataflow, address iteration by defining special control-flow/iteration operators, which are inserted into the dataflow graph as first-class vertices, around a sub-graph of vertices representing the computation to be executed within the loop. However, when applied to a heterogeneous system in which existing vertices represent relatively long-running activities, adding into a graph vertices that do not correspond to computations of the workload is costly in terms of performance and consumption of memory and other system resources, including threads.

SUMMARY

The techniques and constructs discussed herein facilitate iteration over an arbitrary sub-graph without loop unrolling. This supports algorithms with data-dependent loop termination, and supports large iteration counts, including as a result of nested iteration, in a resource-efficient manner. The techniques and constructs discussed herein do not add additional vertices to a dataflow graph to represent iteration constructs. Instead, some or all of the existing vertices within the sub-graph that is to be iterated upon based on having additional and/or modified ports and channels associated with them. Despite this simplicity, arbitrary levels of loop nesting may be supported, with termination available at each level. Termination may be either due to a fixed number of iterations having been completed or some data-dependent termination criterion having been met, thereby extending a dataflow engine to support data-dependent iteration in a heterogeneous environment, where architectural diversity introduces data migration and scheduling challenges.

The constructs discussed herein enable a dataflow engine to efficiently support data-dependent control flow in a heterogeneous environment. In some embodiments, the constructs discussed herein can be implemented in an iterative dataflow engine for accelerators (IDEA).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), and/or technique(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 is presented in parts 6A-6U for ease of illustration.

DETAILED DESCRIPTION

Overview

Figure 1:
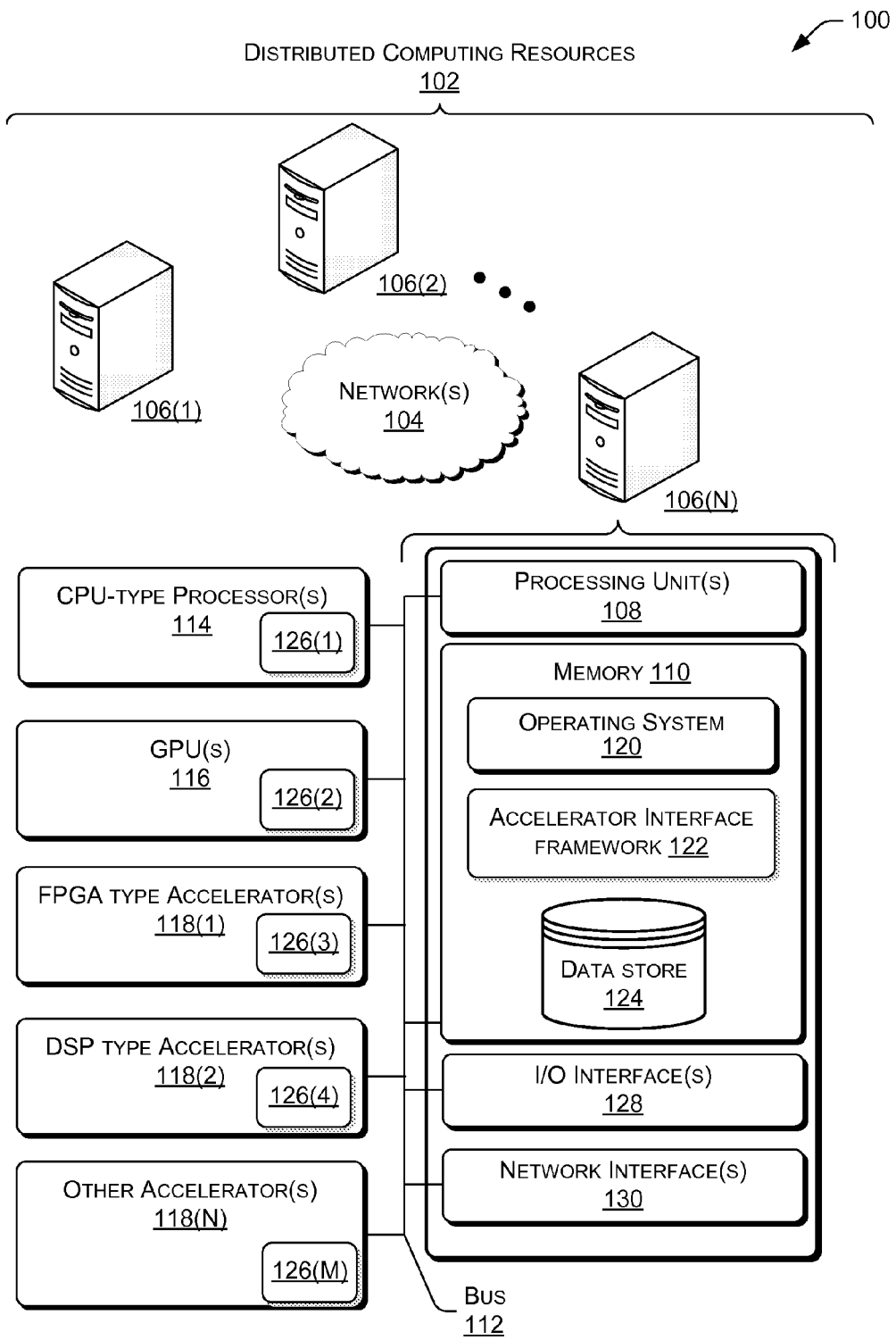
FIG. 1 is a block diagram depicting an example environment in which embodiments of iteration support in a heterogeneous dataflow engine can operate.

Embodiments described herein provide techniques and constructs to improve execution speed and/or reduce resource utilization for distributed iterative computation using heterogeneous specialized resources including, for example, processors and accelerators. Such heterogeneous specialized resources often require specialized programming. For example, heterogeneous specialized resources may have very different execution models as is the case for graphics processing units (GPUs) and computer processing unit (CPUs). As another example, heterogeneous specialized resources may introduce additional communication requirements as data in various formats will be communicated between the heterogeneous specialized resources. The flexibility of the techniques and constructs described herein enables programmers of differing skill levels, and not just those with advanced degrees and/or many years of experience, to create programming that takes advantage of heterogeneous specialized resources without needing to specify which resource will execute a particular routine or where data is particularly stored.

In contrast to previous approaches, the techniques and constructs discussed herein are designed to be implemented and executed at runtime of the dataflow graph, which is the period of execution of the dataflow graph after the dataflow graph has been initialized. Both graph initialization and execution occur during program runtime, which is the period during which a computer program is executing, in some embodiments on a CPU, while the vertices of dataflow graphs processed on this system represent units of work to be executed on either the same CPU or an accelerator present on or accessible to the system.

Embodiments described herein provide techniques and constructs applicable to solve problems encountered in distributed iterative computation on heterogeneous processors and/or accelerators. In various instances, an accelerator can include one or more of a GPU, a field-programmable gate array (FPGA), another class of digital signal processor (DSP), or other hardware logic components that may, in some instances, be driven by the CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Embodiments of an iterative dataflow engine for accelerators (IDEA), as described herein, provide for expression of a computation that has conditional data movement without complicating dataflow expression in a graph model or inhibiting efficiency of a system implementing the IDEA. IDEA extends a basic DAG-based dataflow execution engine with constructs that can be composed to express iterative structures and data-dependent control flow. In some embodiments, an IDEA operates entirely in user mode versus kernel mode, which means the associated accelerator interface framework can operate as an application.

An IDEA distinguishes between application level computations and lightweight computations. Lightweight computations can include evaluating predicates for moving data and routing conditional and predicate computations to hardware that is suited to the lightweight computations, rather than more powerful or flexible hardware that is better suited to application level computations. In various embodiments, an IDEA leverages existing graph structures by annotating datablocks with control codes or control signals. In some embodiments, rather than evaluating predicates or conditionals on nodes, channels, or connections between nodes, have conditional properties for performing lightweight evaluation.

As described further herein, embodiments provide an application programming interface (API) that allows programmers to encapsulate snippets of executable code of a program into accelerator tasks. In various embodiments, the API allows programmers to generate a graph with a node corresponding to each of the accelerator tasks and with edges that represent the dataflow and data dependencies between the accelerator tasks. The API can expose a scheduler that can use the generated graph to schedule execution of the accelerator tasks across multiple heterogeneous processors and/or accelerators. Further, the API can provide a logical construct of data on memories of the heterogeneous processors and/or accelerators. The logical construct of data as discussed herein is called a datablock. The programmer can store and use data stored on datablocks without knowing where on the heterogeneous processors and/or accelerators the data is stored. The scheduler can schedule execution of the accelerator tasks to minimize the amount of data that is copied to and from the accelerators based on datablocks and the generated graph.

Various embodiments provide a protocol by which a service: 1) can represent iteration constructs without adding vertices to a dataflow graph, 2) can support applications with arbitrary levels of loop nesting, 3) can support loops with fixed iteration counts or with data-dependent termination, and 4) can support large iteration counts, including as a result of nested iteration, in a resource-efficient manner. Accordingly, in at least one embodiment, iteration support in a heterogeneous dataflow engine is implemented in a single-machine/multiple processor and/or accelerator environment. Meanwhile, in at least one embodiment, iteration support in a heterogeneous dataflow engine is implemented in a network-distributed multiple processor and/or multiple accelerator environment. The network-distributed environment may include one or more types of computing resources, which may include, for example, computing, networking and/or storage devices. A network-distributed environment may also be referred to as a cloud-computing environment.

The techniques described herein implement a heterogeneous dataflow engine capable of supporting iteration including arbitrarily nested iteration using accelerators. A dataflow graph is a smart programming and execution model for iterative workload on a heterogeneous system for a number of reasons. As a first example, the graph eliminates the need for control to be orchestrated centrally, which simplifies scheduling. As a second example, the graph expresses tasks and producer-consumer relationships among the tasks so the programmer does not write code for communication, synchronization, and data movement. In some embodiments the graph only expresses such tasks and producer-consumer relationships, which can significantly reduce the amount of coding needed from the programmer. The graph can also express inherent parallelism in the workload, enabling a runtime to exploit this parallelism. In this context, a runtime indicates a code that is part of a dataflow platform or system, and in some embodiments the runtime can be synonymous with the dataflow engine.

For example, the model is dynamic, allowing the model to take advantage of hardware variations and improvements such as faster buffers, new types of memory, and other such changes. In this example, a dataflow platform provider can update a datablock implementation, in that platform, for an accelerator to take advantage of new features of an accelerator, and the change can be hidden by the runtime. Examples of new features can include asynchronous calling, support for new types of memory (e.g. texture memory, read-only memory, pinned memory, remote direct memory access (RDMA)-mapped virtual memory, other new types of memory), more flexible use of an existing type of memory, accelerator-side launch of new kernels, and/or or another advancement. A programmer simply upgrades their dataflow program library, relinks their application against the new library, and takes advantage of the new features without needing to modify or rewrite parts of their application code to run their implementation. The platform dynamically implements the changes so the programmer can program without having to update for every change in the hardware. In this way the techniques and constructs described herein do for diverse heterogeneous hardware what operating systems did for homogenous hardware.

Various implementations are agnostic regarding location and particulars of available resources such as a CPU, a GPU, and/or accelerators. For example, such implementations provide for abstraction of details such as brand, number of cores, etc., as well as details of the caches, the memory, and the architecture. The programmer need not address whether the resources are shared with other users or whether a number of programs are to be running at once. For example, a programmer can simply power up a network connected computing device, and, if there is a new resource that has improved support for threading at the hardware level, programmer level changes are not needed to take advantage of the improved support. New threads will be automatically instantiated using the accelerated hardware approach.

Having iteration support in a heterogeneous dataflow engine also helps achieve hardware transparency. Although historically, technology was built around a centralized kind of processing unit that controlled the other hardware pieces of a system and handed out pieces of data for execution here and there, in the face of the increasing diversity of hardware resources, hardware transparency is becoming increasingly important for a multitude of heterogeneous resources.

Entities that make specialized hardware currently provide toolkits for programmers to write hardware-specific code. Such tools are proprietary for programming a particular CPU, GPU, etc. from each entity, and code for one will typically not work with code for another. Programmers are fundamentally limited by the lack of standardization and are forced to employ additional systems or libraries, which in turn must be kept updated in order to program for these specialized devices. Moreover, due to the increasingly vast number of specialized devices, programming for specialized devices wastes valuable programming resources because the programmer is forced to revise their code with each change in the available devices.

The IDEA, as described herein, provides a new way to express computations, so programmers do not need to write code that essentially mirrors an operating system for each program. It is inefficient for a programmer to code such a flexible and robust framework as an operating system for each program in order to employ a GPU, an FPGA, a DSP, etc.

The co-pending and commonly entitled "Scheduling Accelerator Tasks On Accelerators Using Graphs," filed on Mar. 1, 2012, which is incorporated herein by reference, introduced a datablock construct and discussed a PTask model for a dataflow graph. The IDEA extends the PTask model of the graph so that virtually any system can be implemented without centralized control in order to shorten execution time. As one example, a heterogeneous dataflow engine with iteration support facilitates control flow for efficiently ranking pages on the World Wide Web via a PAGERANK or other link-analysis and/or probability-distribution-style iterative algorithm. As another example, a heterogeneous dataflow engine with iteration support facilitates computations that may prematurely end due to convergence.

A heterogeneous dataflow system that supports iteration, as described herein, provides a set of control flow constructs for dealing with diverse hardware. Such a system can be useful for implementing a user interface (UI) including a natural user interface (NUI), direct input, such as via touch screens, and/or indirect input such as gesture recognition using cameras or other sensors, mouse, pen, and/or other types of indirect input. Such a system can also be useful for acceleration of machine learning, imaging processing, computer vision, bioinformatics, and/or another problem domain requiring computationally intensive analysis of large amounts of data, etc.

In one example implementation, the constructs discussed herein can be used to implement a variant of optical flow, a parallel computer vision algorithm. Optical flow relies heavily on nested loops, making it difficult to express without explicit support for iteration such as in a dataflow system. Optical flow describes the apparent motion of brightness patterns in a sequence of two-dimensional images and is a building block for image processing and computer vision algorithms such as those used for removing rolling shutter wobble from video. Most optical flow algorithms use iterative optimization of an energy function, either fixing the number of iterations when low latency or deterministic performance is the primary objective, or iterating until error in the motion drops below a threshold when quality is the primary objective. In the example implementation, the IDEA enables up to 18× speedup over a sequential implementation and 32% speedup over a GPU implementation using synchronous host-based control. In parallel computing, speedup refers to how much faster a parallel algorithm is than a corresponding sequential algorithm. For iteration support in a heterogeneous dataflow engine, as described herein, speedup also refers to how much faster the IDEA is than a corresponding GPU implementation using synchronous host-based control.

Various embodiments are described further with reference to FIGS. 1-9.

Illustrative Environment

FIG. 1 shows an example environment 100 in which embodiments of iteration support in a heterogeneous dataflow engine can operate. In some embodiments, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some embodiments, network(s) 104 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various embodiments, distributed computing resources 102 include devices 106(1)-106(N). Embodiments support scenarios where device(s) 106 can include one or more computing devices that operate in a cluster or other grouped configuration to share resources, balance load, increase performance, provide fail-over support or redundancy, or for other purposes. Although illustrated as desktop computers, device(s) 106 can include a diverse variety of device types and are not limited to any particular type of device.

Device(s) 106 can include any type of computing device having one or more processing unit(s) 108 operably connected to memory 110 such as via a bus 112, which in some instances can include one or more of a system bus, a data bus, an address bus, a PCI bus, a Mini-PCI bus, and any variety of local, peripheral, and/or independent buses. Processing unit(s) 108 may represent, for example, a CPU incorporated in device 106.

Device(s) 106 can include, but are not limited to, desktop computers, server computers, personal computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of processing device such as one or more separate processor device(s) 114, such as CPU-type processors, GPUs 116, or accelerator device(s) 118.

In some embodiments, as shown regarding device 106(N), memory 110 can store instructions executable by the processing unit(s) 108, which may represent a CPU incorporated in device 106. Memory 110 can also store instructions executable by an external CPU-type processor 114, executable by a GPU 116, and/or executable by an accelerator 118, such as an FPGA type accelerator 118(1), a DSP type accelerator 118(2), or any internal or external accelerator 118(N). In various embodiments at least one GPU 116 and/or accelerator 118 is incorporated in device 106, while in some embodiments one or more of GPU 116 and/or accelerators 118 are external to device 106, as illustrated in FIG. 1. Executable instructions stored on memory 110 can include, for example, an operating system 120, an accelerator interface framework 122, and other modules, programs, or applications that are loadable and executable by processing units(s) 108, 114, and/or 116. Alternatively, or in addition, the functionally described herein can be performed, at least in part, by one or more hardware logic components such as accelerators 118. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. For example, accelerator 118 (N) can represent a hybrid device, such as one from ZYLEX or ALTERA that includes a CPU course embedded in an FPGA fabric.

In the illustrated embodiment, memory 110 also includes a data store 124. In some embodiments, data store 124 includes data storage such as a database, data warehouse, or other type of structured or unstructured data storage. In some embodiments, data store 124 includes a relational database with one or more tables, indices, stored procedures, and so forth to enable data access. Data store 124 can store data for the operations of processes, applications, components, and/or modules stored in memory 110 and/or executed by processor(s) 108, 114, and/or 116, and/or accelerator(s) 118. For example, data store 124 can store version data, iteration data, clock data, and other state data stored and accessible by the framework 122. Alternately, some or all of the above-referenced data can be stored on separate memories 126 such as a memory 126(1) on board a CPU type processor 114, memory 126(2) on board a GPU 116, memory 126(3) on board an FPGA type accelerator 118(1), memory 126(4) on board a DSP type accelerator 118(2), and/or memory 126(M) on board another accelerator 118(N).

Device(s) 106 can further include one or more input/output (I/O) interfaces 128 to allow device 106 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). Device 106 can also include one or more network interfaces 130 to enable communications between computing device 106 and other networked devices such as other device(s) 106 over network(s) 104. Such network interface(s) 130 can include one or more network interface controllers (NICs) or other types of transceiver devices to send and receive communications over a network.

Figure 2:
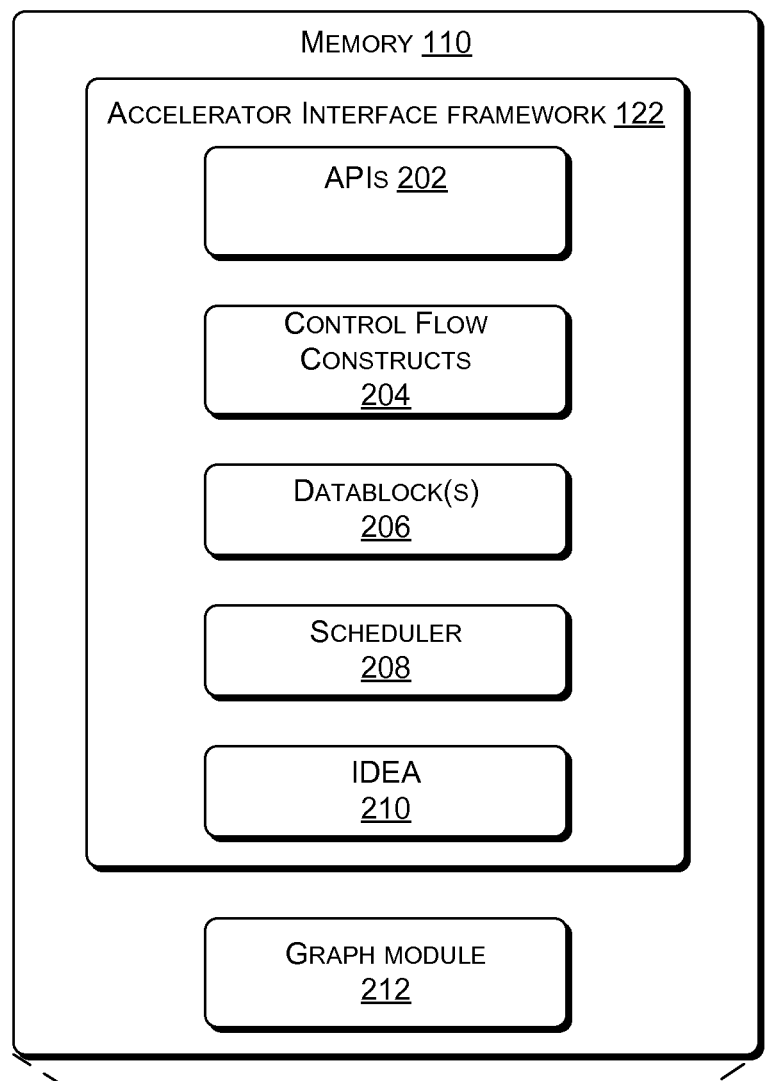
FIG. 2 is a block diagram depicting an example architecture that can perform iteration support in a heterogeneous dataflow engine, according to various embodiments.

FIG. 2 illustrates example components of accelerator interface framework 122 stored on memory 110 in various embodiments. As with FIG. 1, although illustrated as a desktop computer, device 106 may be implemented as a diverse variety of device types and is not limited to any particular type of device. Device 106 can include any type of computing device having one or more processing unit(s) 108 operably connected to memory 110.

In various embodiments, the accelerator interface framework 122 stored on memory 110 may expose an application programming interface (API) 202 that provides a dataflow programming model in which a programmer writes code to manage a graph structured computation using control flow constructs 204 as well as potentially other tools. According to some embodiments, the graph may be a directed acyclic graph (DAG) or a cyclic graph, and may include a plurality of nodes connected by a plurality of edges. In some implementations, a unit of data that flows along the edges of a graph may be represented by a datablock 206. Each datablock 206 may include pointers that map the datablocks to one or more locations in the separate memories 126. The accelerator interface framework 122 may also include a scheduler 208 to schedule and coordinate the execution of one or more tasks, such as accelerator tasks, among the processors 108, 114, and/or 116, and/or accelerators 118. In various embodiments, the accelerator interface framework 122 may operate as an iterative dataflow engine for accelerators (IDEA) 210.

A graph module 212 stored on memory 110 can be configured to represent a plurality of accelerator tasks in a graph including a plurality of nodes and a plurality of edges. In some embodiments, a node of the plurality of nodes corresponds to an accelerator task and an edge of the plurality of edges corresponds to a channel that connects two nodes of the plurality of nodes to carry a flow of data as a plurality of datablocks between two of the plurality of accelerator tasks.

Although FIG. 2 depicts API 202, control flow constructs 204, datablock(s) 206, scheduler 208, and IDEA as part of the accelerator interface framework 122, embodiments are not so limited and in some cases, for example, the API 202, the control flow constructs 204, the datablock(s) 206, the scheduler 208, the IDEA 210, and/or the graph module 212 can operate as separate modules in communication with or accessing common data with the framework 122 from memory 110 or from distributed memories.

The API 202 further allows programmers to generate a graph with a node corresponding to each of the accelerator tasks and with edges that represent the dataflow and data dependencies between the accelerator tasks. The API 202 can expose the scheduler 208, which can use the generated graph to schedule execution of the accelerator tasks across multiple heterogeneous processors and/or accelerators, e.g., 108, 114, 116, 118. The API 202 further provides a logical construct of the various memories 126 of the heterogeneous processors and/or accelerators called a datablock 206. The programmer can store and use data stored on the datablocks 206 without knowing where on the heterogeneous processors and/or accelerators the data is stored. The scheduler 208 can schedule execution of the accelerator tasks to minimize the amount of data that is copied to and from the accelerators based on the datablocks and the generated graph.

Embodiments of IDEA 210, as described herein, provide for expression of a computation that has conditional data movement without complicating dataflow expression in a graph model or inhibiting efficiency of a system implementing the IDEA 210. IDEA 210 extends a basic DAG-based dataflow execution engine with constructs that can be composed to express iterative structures and data-dependent control flow. In some embodiments, an IDEA 210 operates entirely in user mode versus kernel mode, which means the associated accelerator interface framework can operate as an application.

Computer readable media may include computer storage media and/or communication media. Computer storage media includes volatile memory, nonvolatile memory, and/or other persistent and/or auxiliary computer storage media, removable and non-removable computer storage media implemented in any method or technology for storage of information such as computer readable instructions, data structures, program modules, or other data. Memory 110 is an example of computer storage media. Thus, the memory 110 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media may embody computer readable instructions, data structures, program modules, or other data in a modulated data signal, such as a carrier wave, or other transmission mechanism. As defined herein, computer storage media does not include communication media. That is, memory 110 and the described computer storage media encompassed thereby does not include communications media consisting solely of a modulated data signal, a carrier wave, or a propagated signal, per se.

Illustrative Control Flow Constructs

Figure 3:
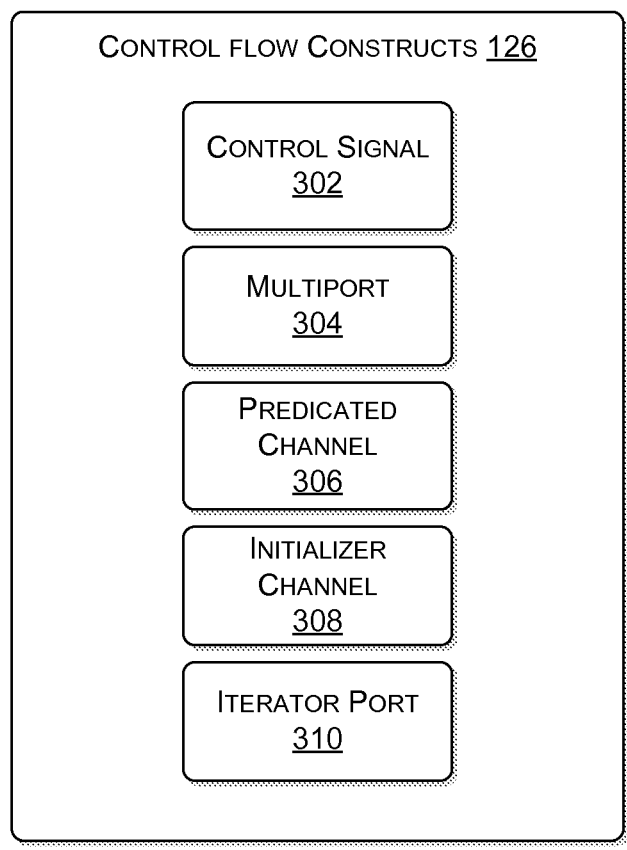
FIG. 3 is a block diagram depicting example control flow constructs to perform an iterative computation, according to some embodiments.

FIG. 3 is a block diagram depicting example control flow constructs 204 for a heterogeneous dataflow engine to perform an iterative computation, according to some embodiments. An iterative dataflow engine for accelerators (IDEA) as described herein extends a basic DAG-based dataflow execution engine with constructs that can be composed to express iterative structures and data-dependent control flow. In some embodiments, an IDEA operates entirely in user mode versus kernel mode, which means the accelerator interface framework 122 can operate as an application.

As described herein, nodes in a graph represent tasks or computations, whose inputs and outputs manifest as ports. Ports can be connected by channels, and data can move through channels as discrete chunks or objects called datablocks, such as datablock(s) 206. In an example implementation, a programmer codes to an API, such as API 202, to construct graphs from these objects, and drives the computation by pushing and/or pulling datablocks to and from channels, respectively. A task represented by a particular node executes when a datablock is available at each input port of the node. In various embodiments, a unique thread manages each task (i.e., node) in a graph, allowing the IDEA to overlap data movement and computation for different tasks. In at least one embodiment, the iteration support in a heterogeneous dataflow engine system described herein employs aspects of an approach to scheduling tasks as described in co-pending and commonly assigned, entitled "Scheduling Accelerator Tasks On Accelerators Using Graphs," filed Mar. 1, 2012, which is incorporated herein by reference.

In some embodiments, a base system, like most dataflow engines, allows only computations that are represented by a directed acyclic graph (e.g., DAG). In contrast, expressing iteration in a graph requires support for cyclic graphs and/or support for recursion. Recursion typically requires a dynamic graph structure, which significantly complicates synchronization and optimization.

In contrast to classical dataflow models, the IDEA's control flow constructs 204 extend the functionality of ports and channels by annotating (piggy-backing) predicates and other control codes or control signals and other routing functionality onto existing graph structures to avoid the addition of specialized first class nodes in contrast to classical dataflow models.

Classical dataflow models allow the addition of specialized nodes such as predicates, selectors, and distributors, which can be composed in a cyclic graph to express arbitrary iteration. However, expressing these constructs as first-class nodes in a graph, makes light-weight operations, such as predicate evaluation and routing, schedulable entities. Expressing these constructs as first-class nodes in a graph complicates the scheduler, and makes it difficult to preserve locality. For example, a predicate node may be scheduled on a computational resource such that large amounts of data must be moved to execute a small number of instructions. A scheduler, such as scheduler 208 as described herein, can be coded to avoid this waste of resources by employing control flow constructs 204 of the IDEA, which can annotate (piggyback) predicates and routing functionality onto existing structures such as datablocks.

As illustrated in FIG. 3, in various embodiments, the IDEA uses the following control flow constructs: control signal 302, multiport 304, predicated channel 306, initializer channel 308, and iterator port 310. Collectively, these constructs can enable iteration without additional specialized task nodes, scheduling and resource-management for tasks can maintain conceptual simplicity, and/or routing decisions can be computed locally by construction; moreover, other control flow constructs are possible.

Control signals 302 control signals can identify accelerator type affinity and other routing functionality; the control signals can be inputs to predicates, which provide a way to express control flow and/or conditional data movement on a channel. In various embodiments, IDEA graphs carry control signals 302 by annotating a datablock such as a datablock 206 with a control code. A programmer can define arbitrary flow paths for these signals using API 202 and/or another module exposed by API 202 to define a control-propagation pair, which connects port pairs between tasks. Any control code or control signal 302 annotating a datablock received at a first port will be propagated with the datablock to the second port. Examples of control signals 302 include signals to begin or end a stream or an iteration, e.g., BEGIN/END-STREAM and BEGIN/END-ITERATION.

Multiport 304 is a specialized input port to which multiple, prioritized, input channels connect. When datablocks 206 are simultaneously available on multiple input channels, the multiport 304 will dequeue a datablock from one of the input channels, giving preference to the highest priority input channel.

Predicated channel 306 allows a datablock to pass through a predicated channel 306 when a predicate holds for the datablock. However, if the predicate does not hold for the datablock, i.e., the predicate fails, the datablock may be dropped from the channel or queued for later re-evaluation. In an example embodiment, an API for configuring predicates, such as API 202, allows the programmer to define whether the datablock is dropped from the channel or queued for later re-evaluation. In some embodiments, a predicate function can be a programmer-supplied callback. However, in at least one embodiment, predicated channel 306 can natively support common predicates such as open/close on control signals such as BEGIN/END-ITERATION.

Initializer channel 308 provides a predefined initial value datablock 206. In an example embodiment, an initializer channel 308 can be predicated similar to a predicated channel 306 such that the initializer channel 308 is always ready, except when the predicate fails. In this way, initializer channel 308 can be configured to operate as a predicated channel configured to evaluate the initial value datablock as an initial predicate. Initializer channels 308 are configured for construction of sub-graphs where, for example, iteration of a loop requires an initial value that may not be obtainable via an externally exposed channel.

This is a very common idiom for iterative flow control that requires an initial value with which to work. In traditional dataflow, every new value has to be programmed to be pushed into a specific channel, and it can be difficult for a programmer to determine when and on what channel to push an initial value. Particularly if nested in other constructs, determining when a value needs to be initialized is not trivial in traditional dataflow. In contrast, initializer channel 308 can provide a predefined initial value datablock, without the programmer pushing an initial value to a specific channel, and/or initializer channel 308 can be predicated such that the initializer channel 308 is ready any time the predicate holds.

Iterator port 310 is a port responsible for maintaining iteration state of a computation and propagating control signals when iteration begins or ends. An iteration state is a property of iterative computation. Using iteration port 310 with a datablock 206 makes enable maintenance of such a state without requiring additional data structures for which maintaining synchronization is would be required. An iterator port 310 can be configured to maintain a list of ports within its scope, which are signaled when iteration state changes. In addition, an iterator port 310 can also be configured to propagate control signals such as BEGIN/END-ITERATION along programmer-defined control propagation paths, which, in combination with a backward/forward predicated channel 306, can conditionally route data backward in the graph to begin another iteration or forward in the graph when a loop completes. In at least one embodiment, an iterator port 310 can use callbacks to implement arbitrary iterators, or select from a handful of predefined functions, such as integer-valued loop induction variables.

In some embodiments, the introduction of unwanted non-determinism can be avoided by configuring the above constructs such that the inputs to a multiport 304 are predicated channels 306, with predicates configured such that at any given moment at most one channel will allow a datablock 206 to pass through. However non-determinism may be acceptable, and even desirable, in some embodiments. For example non-determinism can allow use of a value from one channel until an update is available via another channel.

Illustrative Dataflow Amongst Heterogeneous Resources

Figure 4:
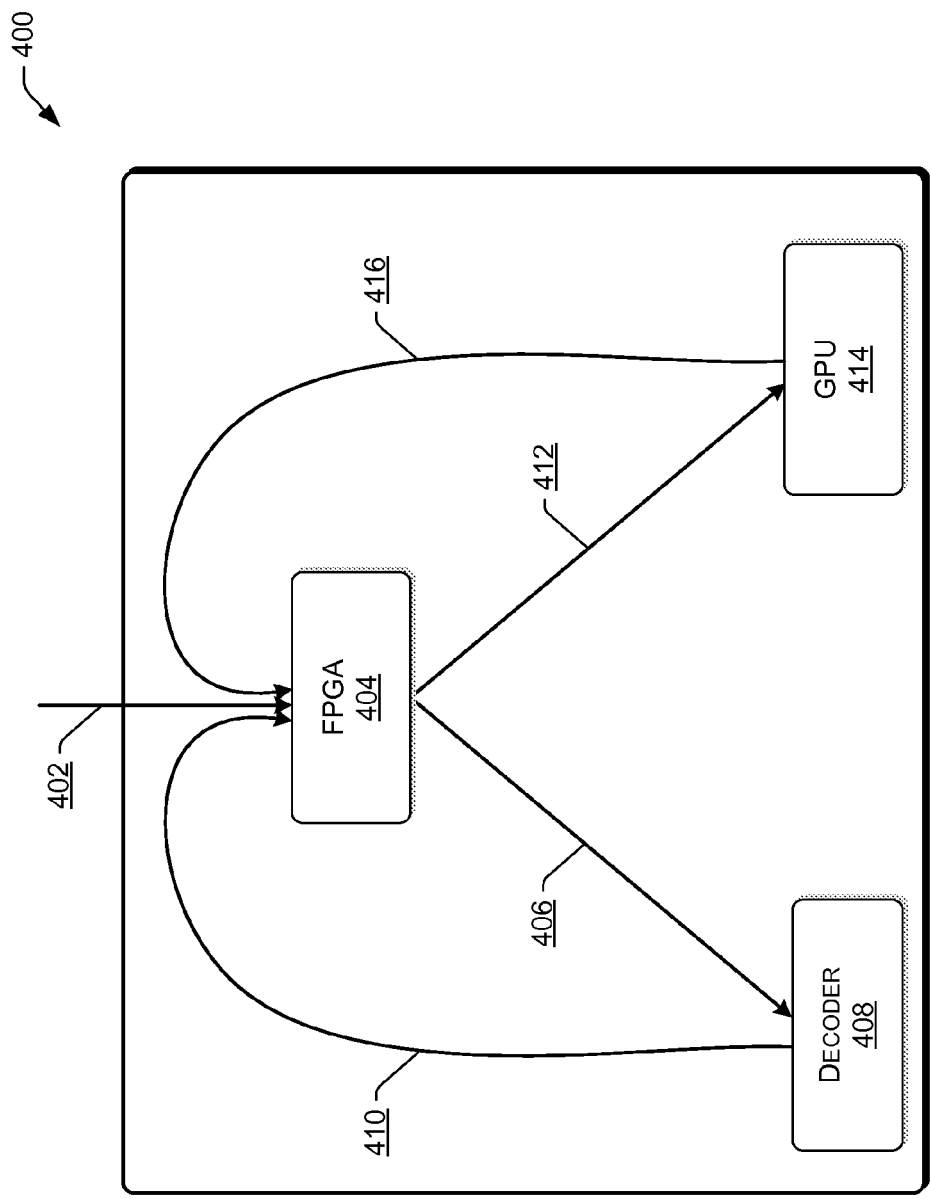
FIG. 4 is a flow diagram illustrating example dataflow amongst heterogeneous resources, in particular between a processor and multiple accelerators according to at least one embodiment.

FIG. 4 is a diagram illustrating example dataflow amongst heterogeneous resources, in particular between a processor and multiple accelerators according to at least one embodiment.

Iteration support in a heterogeneous dataflow engine addresses programmability challenges in parallel applications running in the presence of heterogeneous potentially distributed computing resources. For example, fabric computing, focusing primarily on GPUs is increasingly common, super-computers may be GPU-based, and cluster-as-service systems like AMAZON Elastic Compute Cloud (EC2) make GPUs available for users to rent as virtual computers.

Compute-bound algorithms, including at the cluster or cloud-computing scale, hamper efficient computing, making acceleration with specialized hardware an attractive approach. However, while tools are increasingly improved, programming these systems remains the province of expert programmers due to implementation complexity. Achieving parallelism in heterogeneous systems involves challenges at many layers of the technology stack including front-end programming tools and runtimes. Embodiments described herein can be implemented on the runtime to make parallel heterogeneous systems accessible for non-expert programmers.

An iterative dataflow engine for accelerators (IDEA) as described herein provides a runtime system for heterogeneous systems made up of CPUs, GPUs, FPGAs, DSPs, and/or other accelerators. The IDEA supports a set of primitives that enable a dataflow system to efficiently support algorithms with iterative, data-dependent control flow. Implementations of the techniques and constructs as described herein have been implemented in a system that uses these primitives to implement applications including k-means clustering, PageRank, deep neural networks and decision tree learning. In addition, implementations of the techniques and constructs as described herein avoid elevation of instructions to tasks.

In one example embodiment, a system 400 may receive a datablock as input on channel 402, which in some instances represents an input channel that carries encrypted content. In a simple implementation that omits a predicate, an FPGA 404 may perform decryption as an accelerator task. Once decrypted, the content of the datablock may be identified by a control signal as video content destined for a decoder, and channel 406 may carry the datablock to decoder 408 to perform decoding as an accelerator task. In various embodiments, decoder 408 may represent a variety of accelerators such as an H264 chip, a digital signal processor (DSP), or another hardware logic component. Once decoded, the content of the datablock may indicate via the control signal, that evaluation of a predicate, an "if" statement, for example, is called for, and channel 410 may carry the datablock back to FPGA 404 or another accelerator suited to execute such a lightweight instruction. While the decoder 408 may be able to execute the "if" statement instruction, to have the decoder 408 tied up doing so may represent a mismatch of computing resources for the task, particularly if there is additional content awaiting decoding. Based on the predicate, FPGA 404 may send the content of the datablock via channel 412 to GPU 414 for processing to cause the content to be displayed on an associated output device such as a television or a video screen. Once the processing task has been completed at the GPU 414, another predicate may be indicated, and channel 416 may carry the datablock back to FPGA 404 or another accelerator suited to executing such a lightweight instruction. While the GPU 414 may be able to execute the instruction, to have the GPU 414 tied up doing so may represent a mismatch of computing resources for the task, particularly if there is additional content awaiting processing for display.

Typically, accelerators do not accept input via multiple channels as illustrated for FPGA 404, and operating systems running on CPUs typically schedule large entities like processes and threads, rather than scheduling lightweight instructions. For a CPU to schedule a lightweight instruction such as an "if" statement, would essentially elevate the instruction to an algorithmic command that is equivalent to a first class node on a dataflow graph, which would likely result in a waste of computational resources. Iteration support in a heterogeneous dataflow engine as described herein employs a multiport construct, such as multiport 304 to manage input from multiple channels while avoiding elevation of instructions to tasks.

In some embodiments, an IDEA can be used as an underlying execution model at run time to avoid scheduling a predicate or other lightweight instruction as a task. Instead of copying the datablock to a CPU or even to FPGA 404 to evaluate the predicates as discussed above, the predicates can be piggy-backed on the datablock and evaluated as part of the channels 410 and 416.

In some embodiments, if a predicate fails, the datablock associated with the predicate can be dropped from the channel in which it is being evaluated, such as channel 410 or channel 416.

Thus, the IDEA can provide structures that have multiple communication channels that sometimes finish communicating and sometimes do not. Such channels provide for iteration, or cycles in the dataflow graph, because predicates that do not match may close off channels without causing loss of order of the computations, when order is important, and can preserve some pipelining without getting into the challenges of instruction scheduling as discussed above.

For example, in some embodiments, the decision of when to close off a channel may be represented by inserting an "if" statement in a communication channel. Meanwhile, in some embodiments, an IDEA system, such as system 400 can replicate the channel for each viable destination. Thus, a duplicate channel can be provided for each possible predicate outcome.

A multiport construct, such as multiport 304 differs from traditional port constructs that have a one-to-one relationship between an input port and an output port. As shown on FPGA 404, this accelerator has an input port with three channels (410, 402, and 416) coming in and an output port with two channels going out (406 and 412).

Thus, in addition to traditional ports, the IDEA provides for ports that can connect one-to-many or many-to-many, and can evaluate whether a predicate is satisfied in a way that is best suited to the implementation of a particular channel. In various embodiments, one-to-many (or many-to-many) input and/or output ports can evaluate a predicate, while in at least one embodiment, the one-to-many (or many-to-many) input and/or output ports do not evaluate a predicate. In the latter embodiment, evaluating a predicate is a property of channel implementation. In some embodiments evaluation of predicates can be mixed between port and channel implementations.

In some embodiments, channels are specialized to the actual communication that needs to occur. For example, no channel may present a good fit for communicating data directly from a task executing on an FPGA to a task executing on a GPU, and a datablock may still be moved from the FPGA to the CPU to determine whether or not the datablock should then move to the GPU. In this scenario, evaluation of the predicate is a property of the channel implementation rather than requiring a dedicated accelerator, such as an "if" chip.

In at least one embodiment, an existing dataflow execution engine, such as PTask may be mediated on a CPU such as CPU 108, so even if a predicate is evaluated on a GPU 414 or on an FPGA 404, the predicate evaluation will be communicated to the PTask runtime on the host CPU, and the host CPU will decide whether a datablock is communicated to decoder 408 or GPU 414. There is overhead on kernel launch to run a task or a predicate on a GPU or FPGA, which is driven by the CPU. In such a system, the CPU can prepare a message effectively, buffer the message, and track control information, and the CPU can queue the message to the GPU or FPGA. Then the CPU can submit the message to the driver that runs the GPU or FPGA. This leads to latency, memory usage, and data transfers over a bus.

At least one embodiment may facilitate decentralized decision-making in a distributed system made up of computing resources relying on FPGAs, GPUs, DSPs, and "if" chips, rather than relying on a CPU. Although unnecessary copying may be avoided, communication overhead may be added in such an embodiment, as the datablock will now be communicated from the FPGA to the GPU via two hops rather than one.

Control flow, conditional data movement, and predicates are foundational to how computation is expressed in the IDEA, and can be separated from algorithms. One success of programming languages is that control flow can be expressed with logical constructs, and programmers can typically omit control flow constructs from the programmatic implementation.

When predicates, conditional data movement, or control flow constructs become first class nodes they waste implementation overhead due to the logical construct of first class nodes. This occurs because hardware generally cannot balance the relative latencies and costs of such different kinds of operations as algorithmic or user code computations and lightweight instructions such as predicates, conditional data movement, or control flow constructs.

The IDEA provides programmers the ability to express control flow without having to express how the control flow will be accomplished.

Illustrative Dataflow Graphs

Figure 5:
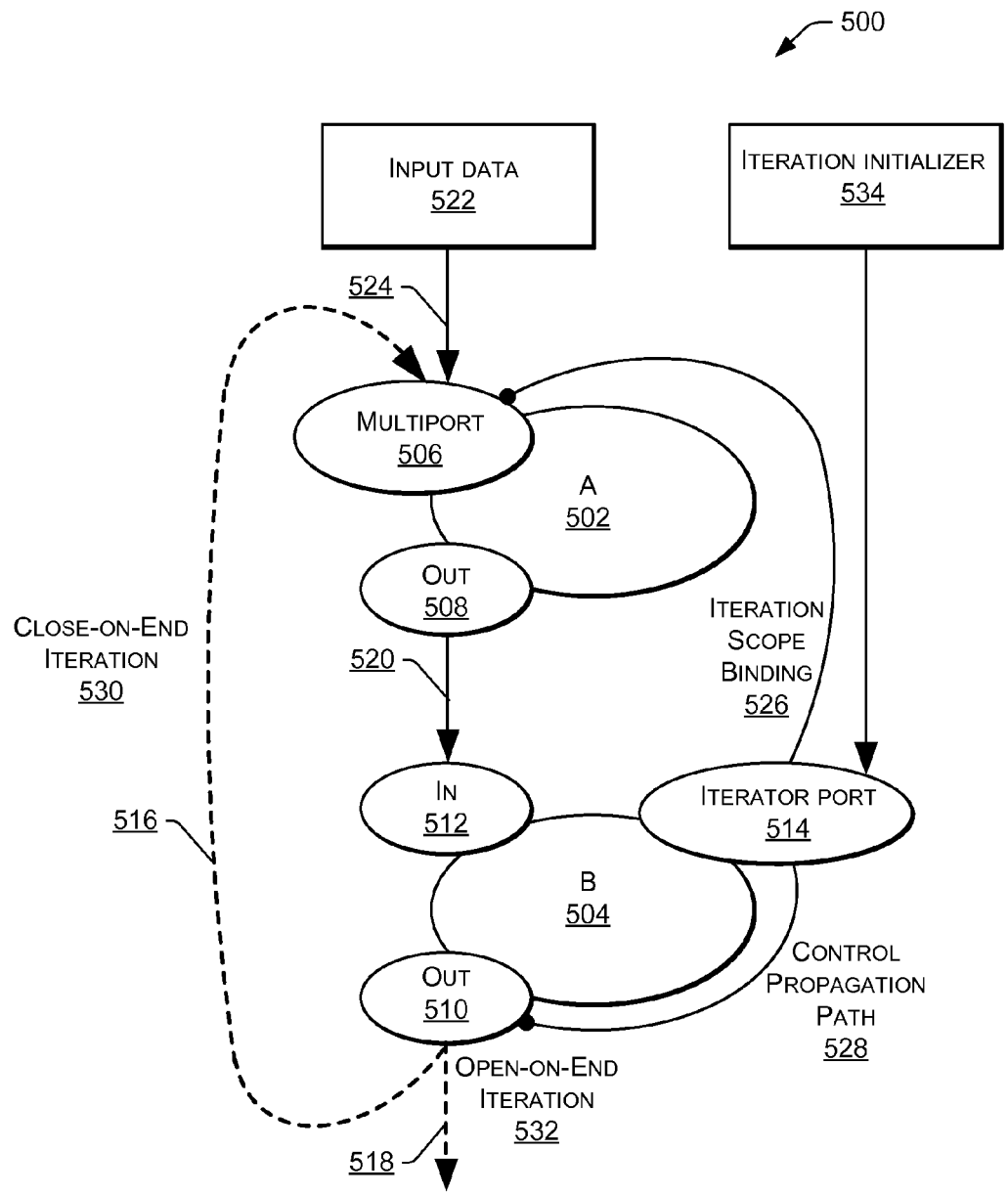
FIG. 5 is a dataflow graph illustrating example control flow constructs to perform an iterative computation, according to some embodiments.
Figure 60:
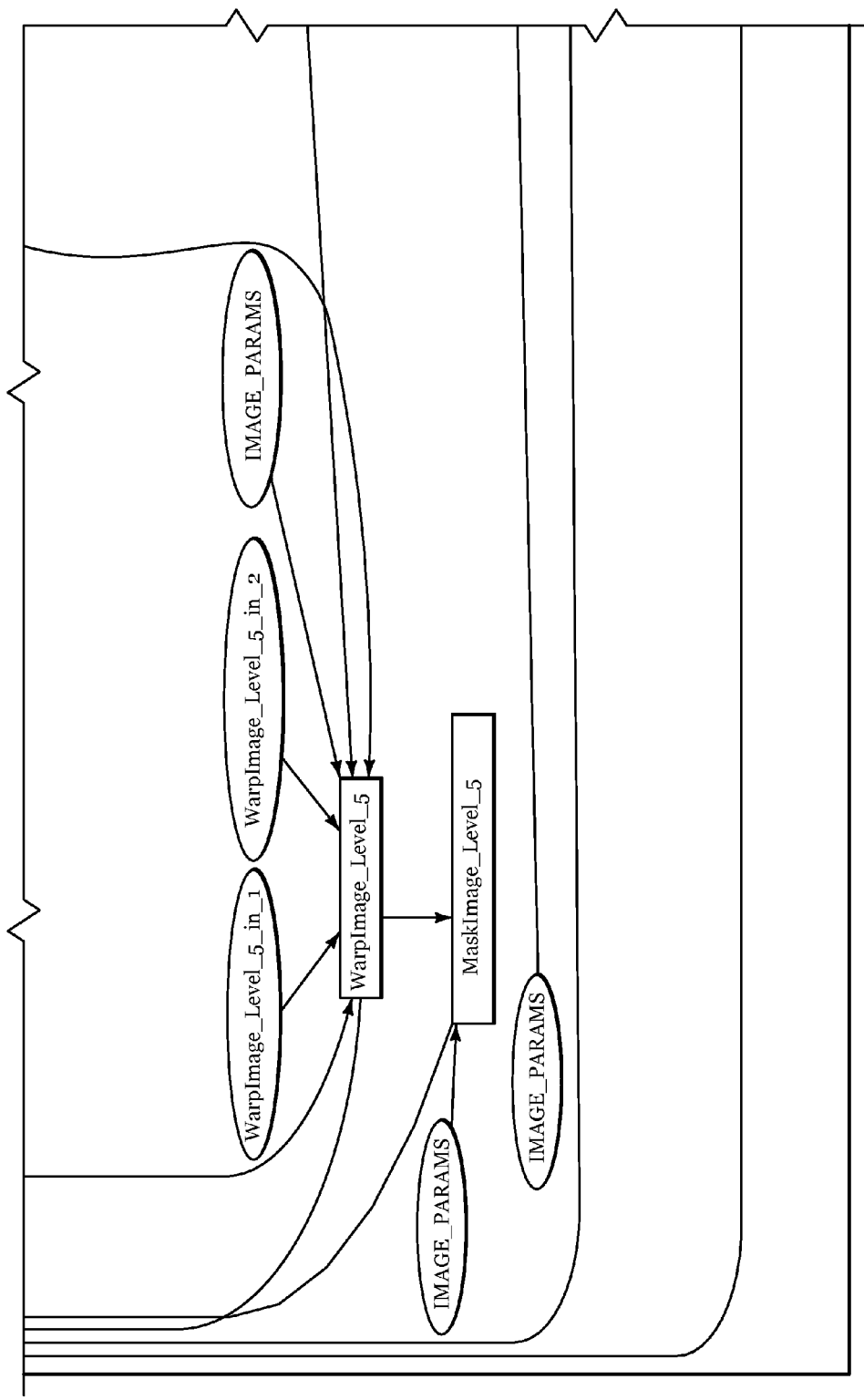

FIG. 5 presents a dataflow graph 500 illustrating example control flow constructs to perform an iterative computation, according to some embodiments.

As illustrated, node A 502 and node B 504 represent accelerator tasks in which algorithms or user code run. Such nodes represent execution of a task at a place where it is natural for an algorithm to run, and some may be more well-suited to run a particular algorithm than others; however, lightweight instructions including predicates, conditional data movement, or control flow constructs, such as "if" statements, may potentially be evaluated in many places. Thus, the IDEA represents lightweight instructions, such as "if" statements, separate from task nodes.

A heterogeneous dataflow engine that supports iteration as described herein provides the ability to specialize channel implementations to be efficient for the kinds of data being communicated, without programmers having to program for the communication. The IDEA enables a programmer to store and use data stored on datablocks, such as datablock 206, without knowing where the data is stored on the heterogeneous processors and/or accelerators such as 108, 114, 116, and/or 118. In some embodiments, a scheduler, such as scheduler 208, can schedule execution of accelerator tasks to minimize the amount of data that is copied to and from the accelerators and/or processors based on datablocks and the generated graph. Representing conditional dataflow in a graph structure as other than a first class node, fundamentally changes the paradigm.

By evaluating a predicate according to a piggy-backed control signal on a datablock in a specialized (predicated) channel, the evaluation no longer demands scheduling for an entity; instead, a predicate becomes a runtime evaluation that does not consume extensive computing resources like the full generality of a CPU, in the same way as an algorithm or user code.

This paradigm also avoids the waste of resources prevalent when a predicate is communicated to a resource such as a CPU for evaluation, only to learn that the predicate fails. The IDEA avoids such unnecessary copying of data to a resource where it will not be used. With the IDEA, the control signals can be inputs to predicates, which provide a way to express control flow and/or conditional data movement on a channel.

FIG. 5 at 500 illustrates an example of how logical constructs can be used to orchestrate an iterative computation.

Node A 502 and node B 504 represent accelerator tasks. Three types of ports are illustrated including specialized multiport 506, standard PTask ports including output ports 508 and 510 and input port 512, and an iterator port 514. Dashed lines 516 and 518 represent predicated channels, and a solid line represents a non-predicated channel such as channel 520.

The illustrated computation executes an iteration or loop, whose body is A( ) followed by B( ) on input data 522, which arrives via channel 524. The multiport 506 input to node A 502 is bound to the scope of the iterator port 514 on node B at 526, and the output port 510 on node B has a control propagation path 528 from the iterator port 514. The predicated channels 516 and 518 going backward and forward from the output port 510 can be configured with CLOSE-on-END iteration 530 and OPEN-on-END iteration 532, respectively. Because the iterator port 514 will set the control signals on datablocks leaving the output port 510, datablocks annotated with an END-ITERATION control code can flow forward via channel 518, and those not so annotated can flow backward via channel 516. The iteration scope binding 526 exposes a predicated channel entering A, accepts only datablocks annotated with control signal BEGIN iteration. When an iteration state datablock is pushed into the iterator port 514, by iteration initializer 534, iterator port 514 signals all objects in its scope, e.g., all objects connected directly or indirectly to iterator port 514, to annotate the next datablock received with a BEGIN iteration control code. Consequently, datablocks follow a cyclical path until a loop completes, after which a new datablock can be consumed from the channel 524 at the top of the graph. In some instances, channel 524 can represent a forward predicated channel at the top of the graph.

The body of the loop may be set to execute some number of times, which can be user definable, fixed, or a property of an ongoing computation. For example, the computation may be converging until reaching zero or until the difference is below some threshold and then output port 510 may forward the datablock on an open-on-end iteration 532 via channel 518 to output the final result.

Control signals provide a straightforward way of evaluating potentially more expensive predicates. For example, as input data 522 flows through the graph, in some instances, iterations are performed on the datablock, and in some instances, the datablock exits the iteration and proceeds forward, perhaps for more processing outside the loop.

Control signals provide for efficient evaluation of the conditions under which a datablock proceeds in one path rather than another. For example, a control signal may indicate that the datablock is at the last iteration, or that the datablock is the last datablock. In that case, on channel 518, the predicate can be, "if a control signal indicates this is the end of the iteration, open channel 518," otherwise stay closed.

In addition, the channel 516, which goes backward, indicates just the opposite. The predicate can be, "if a control signal indicates that this is not the end of the iteration or until a control signal indicates that this is the last datablock of the iteration, open channel 516," otherwise stay closed.

Thus, the IDEA introduces a new type of port, an iterator port 514, also called a meta-port in some embodiments, because the other ports convey datablocks and the iterator port or meta-port 514 conveys iteration-meta-information, rather than data that is used inside a computation. An iterator port 514 is how programming the tail of the loop is accomplished in several embodiments. Thus, the IDEA runtime can execute one loop, evaluate the condition, if the condition holds iterate again, and/or if the condition fails, end iteration.

Iterator port 514 is an extension to the PTask system that allows a programmer to configure iteration in a DAG without unrolling the loop. In some cases a programmer may set iteration by setting the number of iterations to define control propagation path 528. In an example embodiment, commencing computation at node A 502, triggers iteration port 514 to change, by incrementing or decrementing, an iteration counter. In other embodiments, iterator port 514 can change, by incrementing or decrementing, an iteration counter based on an output port, such as output port 510, receiving or preparing to release a datablock. In at least one embodiment, the control propagation path can be arbitrary, meaning the control propagation path can be triggered by the input or the output.

Task A, illustrated at node 502, can receive input data 522, for example datablock 1. Once datablock 1 is available at multiport 506, task A is eligible to be run, to be scheduled, and/or to be executed.

Task A can produce some new output datablock 1', which is related to the input datablock 1. Then datablock 1' can be consumed at task B, to produce the output of task B, datablock 1". Datablock 1", which is the output of Task B is dependent on the input of datablock 1, but it need not logically be the same datablock and can represent modified or derived data.

In some embodiments the iterator port 514 is associated with output port 510. Each time output port 510 produces an output, iterator port 514 can decrement the counter, which controls which piece of control information is admitted on each iteration based on whether or not the count has reached 0.

In some representations, 524+520+516 or 518 represents a dataflow graph for data while 524+520+528+526 represents a dataflow graph for control signals that is separate from, but concurrent to, the dataflow graph for data. Thus, in some embodiments, these two cycles as illustrated in FIG. 5 can represent a control flow graph superimposed on a dataflow graph.

Although in the illustrated embodiment multiport 506 is an input port, in other embodiments, multiport 506 and/or another multiport can be an output port, for example, in the place of output port 510. As illustrated, output port 510 is not a multiport because rather than producing datablocks on two channels, output port 510 is configured to test a predicate, and based on that test, to provide a datablock to either channel 516 or 518.

In various embodiments, for example, while not at the end of iteration, and without a datablock on the backward channel 516, multiport 506 may dequeue a datablock from channel 524. Historically, this action is contrary to dataflow processing because processing begins on data that has moved past where a control host is processing. In other words, processing has moved past the iteration, without finishing the iteration.

The multi-port 506 can dequeue datablocks from multiple input channels, 516, 524, and 526, and the multiport 506 prefers the highest priority channels if multiple channels are ready, which is generally the backward channel 516, the datablock iteration channel. However, in some situations the backward channel 516 will not be the highest priority channel.

For example, in an embodiment for a deep neural network (DNN), a property of the system is performance of matrix algebra on a matrix of weights that change very slowly. The computation may be repeated many (e.g., millions) of times. Eventually the weights begin to converge, that is the change in weights decreases progressively over time. In the DNN embodiment, the most up to date value may not be required in view of the convergence. Thus, a threshold value may be included in a control signal to either halt iteration or to decrease priority of the backward channel when the value reaches the threshold to increase throughput. In this embodiment, the IDEA system can take an available stale version as input rather than waiting for a fresh version.

In at least one other embodiment, called a weakly consistent channel, there are structures in a graph for a DNN that have back edges for weights. The forward channel has a higher priority than the backward channel, yet when no input is available on the forward channel, rather than waiting for fresh input from the forward channel, the multiport will take the weight input from the backward channel. However, when there is input on the forward channel, the multiport will prefer the forward channel for dequeuing and discard the datablock from the backward channel. While the graph of this embodiment has a shape that is similar to the other DNN embodiment, this embodiment expresses a different flow of control according to the established priorities.

FIG. 6 is a dataflow graph illustrating example control flow constructs to perform an iterative computation for a GPU-offloaded implementation of optical flow, according to an example embodiment. FIG. 6 is presented in parts 6A-6U for ease of illustration.

FIG. 6 illustrates a cases study on optical flow performed to examine the control flow primitives supported in the IDEA, to show that naive control-flow support (e.g. explicit loop-unrolling) is insufficient, and to show that on a system with CPUs and GPUs, the primitives in the IDEA enable a dataflow implementation of optical flow that outperforms a sequential CPU implementation by 18× and outperforms a GPU-based implementation using traditional host-based control flow by up to 32%.

One implementation, for example, applied a variation of the Horn-Schunck algorithm, which uses a pyramid of successively smaller resealed versions of the input images. In this example, an optical flow value is calculated first for the smallest images, e.g., the top level of the pyramid, and the result for each level is used to seed the calculation for the next level. This approach allows optimization at the lower levels of the pyramid to converge in fewer iterations than if Horn-Schunck was applied only to full size images.

In at least one implementation, the number of required pyramid levels grows slowly with the image size and each pyramid level features two loops of nested iteration: 1) an inner loop, which iteratively solves a linear system required for each iteration of an outer loop, and 2) the outer loop, which refines the flow estimate. One or both of the inner loop and the outer loop can be implemented to terminate early based on data-dependent convergence tests in various implementations.

This variation of the Horn-Schunck algorithm is difficult to express as dataflow without support for cycles in the graph, recursive graph structures, or other direct support for iteration. Furthermore, such systems do not support expression of data-dependent loop termination. While programmer-controlled loop unrolling can, in some instances, be used to implement a fixed number of iterations, the nested iterations will cause the size of the unrolled graph to expand exponentially. For example, nested iterations will cause the size of the unrolled graph to increase seven fold for a typical input size, e.g., 720HD video. With many algorithms having iteration counts in the tens, hundreds or even thousands, unrolling loops is an untenable approach for such processing.

FIG. 6 illustrates an implementation of the optical flow algorithm in the IDEA using the control-flow constructs described with regard to FIG. 3. In particular, the pattern described with regard to FIG. 5 was used to implement the two nested loops within each level of the image pyramid. FIG. 6, having parts 6A-6U, shows the dataflow graph of the implementation. The example implementation illustrated by FIG. 6 used 18 distinct kernels, comprising approximately 1700 lines of High Level Shading Language for DirectX (HLSL) code, although alternative languages may also be used. The implementation illustrated by FIG. 6 included graph construction and driver code comprising about 1600 lines of C++, although other languages may also be used. In the illustrated implementation, graph construction was performed via a low-level API, where each task, port and channel was added explicitly. Higher-level tools that allow more concise expression and preclude misconfiguration could also be used.

The body of the inner loop contains two tasks with eight parameters each; a dataflow analog constructed using two initializer channels, such as initializer channel 308; ten predicated channels, such as predicated channel 306; and a single iterator port, such as iterator port 310, to manage iteration state. For the illustrated implementation, the initializer channels were set to be open initially and to re-open on END-ITERATION, to seed a new iteration. Each instance of the outer loop, whose body contains 20 tasks (including the two for the inner loop), uses six predicated initializer channels, such as initializer channel 308, configured similarly to those of the inner loop; six predicated channels, such as predicated channel 306, for backward flow to the top of the loop; and two predicated channels, such as predicated channel 306 for data flowing to the next pyramid level. The iterator port, such as iterator port 310, for the outer loops was bound to four multiports, such as multiport 304, on three parallel tasks.

There are three nested loops in the optical flow dataflow graph shown in FIG. 6. The outermost one—that loops over the six levels of the image scaling pyramid that the algorithm is being performed on—is illustrate unrolled to show the iteration in FIG. 6. Accordingly, what is termed the "outer loop" is the outer of the remaining two loops (e.g., the middle loop). Because the pyramid level loop has been unrolled, the 'outer' and 'inner' loop are repeated 5 times, once per pyramid level. Thus, FIG. 6H contains level 5 of the pyramid; FIG. 6J contains level 4 of the pyramid; FIG. 6L contains level 3 of the pyramid; FIG. 6M contains level 2 of the pyramid; FIG. 6U contains level 1 of the pyramid; and FIG. 6T contains level 0 of the pyramid, and data flows down the pyramid, from level 5 to 0. As shown in FIG. 6, the channels of the inner loop at each level look like an onion at the center of the respective pyramid levels.

In at least one embodiment, as represented in FIG. 6, the two tasks containing the body of the inner loop are SOR_Level_x and SOR_1_Level_x where x is the level number. FIG. 6U, for example, illustrates level 1, as shown by SOR_Level_1 and SOR_1_Level_1. SOR_Level_1 and SOR_1_Level_1 define the inner loop for level 1. The two initializer channels associated with each inner loop are connected into the SOR_Level_x task for that level and can be represented by arrows pointing into the SOR_Level_x task labeled dFlowX and dFlowY (not shown). The ten predicated channels, per inner loop at each level include eight back channels from SOR_1_Level_x to SOR_Level_x (in some instances rendered as six to the left and two to the right side), plus two final outputs from SOR_1_Level_x (leading to UpdateFlow_X_Level_x and UpdateFlow_Y_Level_x). SOR_1_Level_x (the second/last task in the inner loop at each level) has an iteration metaport associated with it. In FIG. 6U, for example, the iteration metaport is labeled IterationMetaPort.

The outer loop at each level can represent the subgraph starting with WarpImage_Level_x (or WarpImageInOut_Level_x etc), and ending with UpdateFlow_X_Level_x and UpdateFlow_Y_Level_x.

Figure 6A:
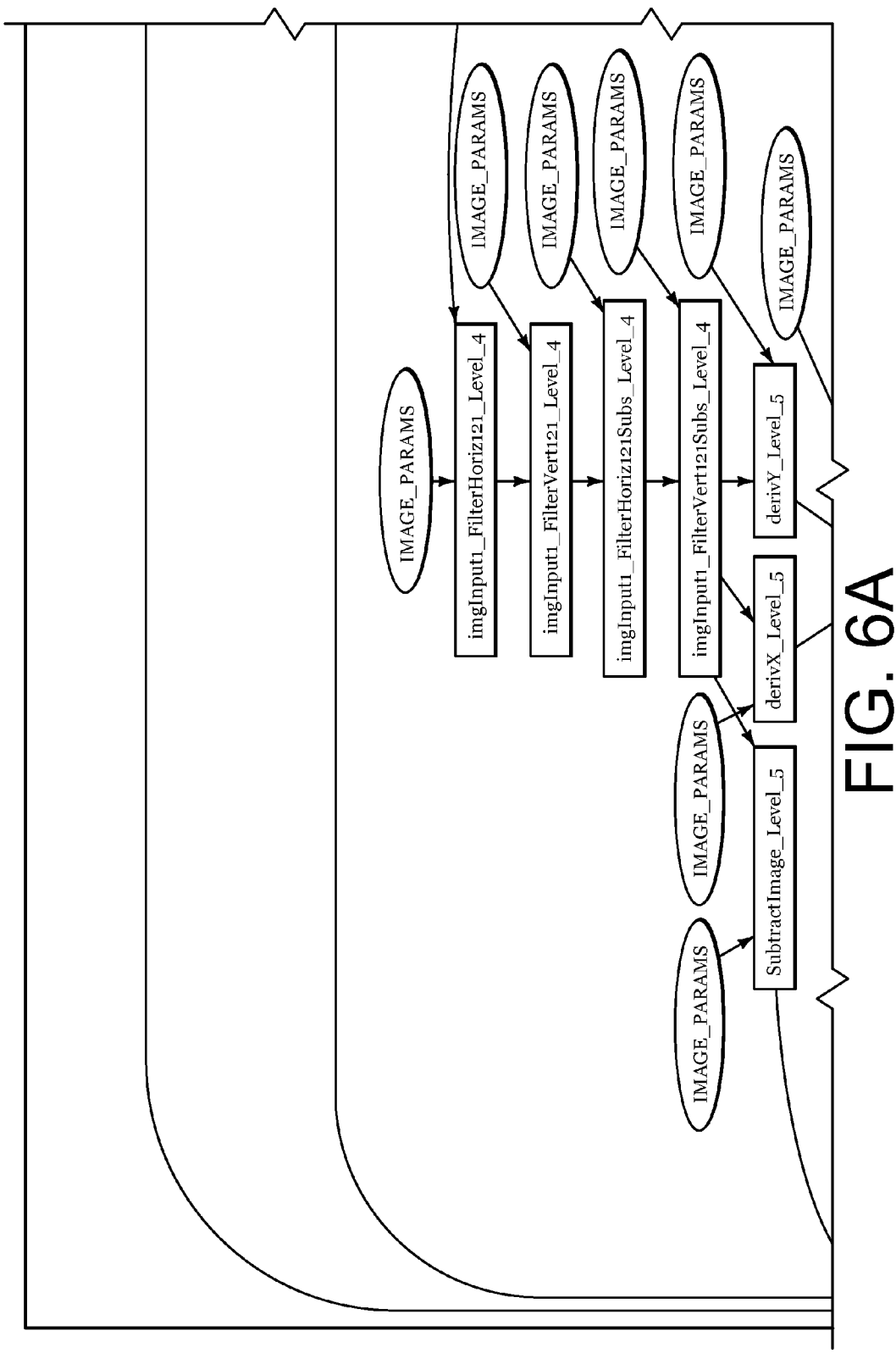
FIG. 6 is a dataflow graph illustrating example control flow constructs to perform an iterative computation for a GPU-offloaded implementation of optical flow, according to an example embodiment.
Figure 6B:
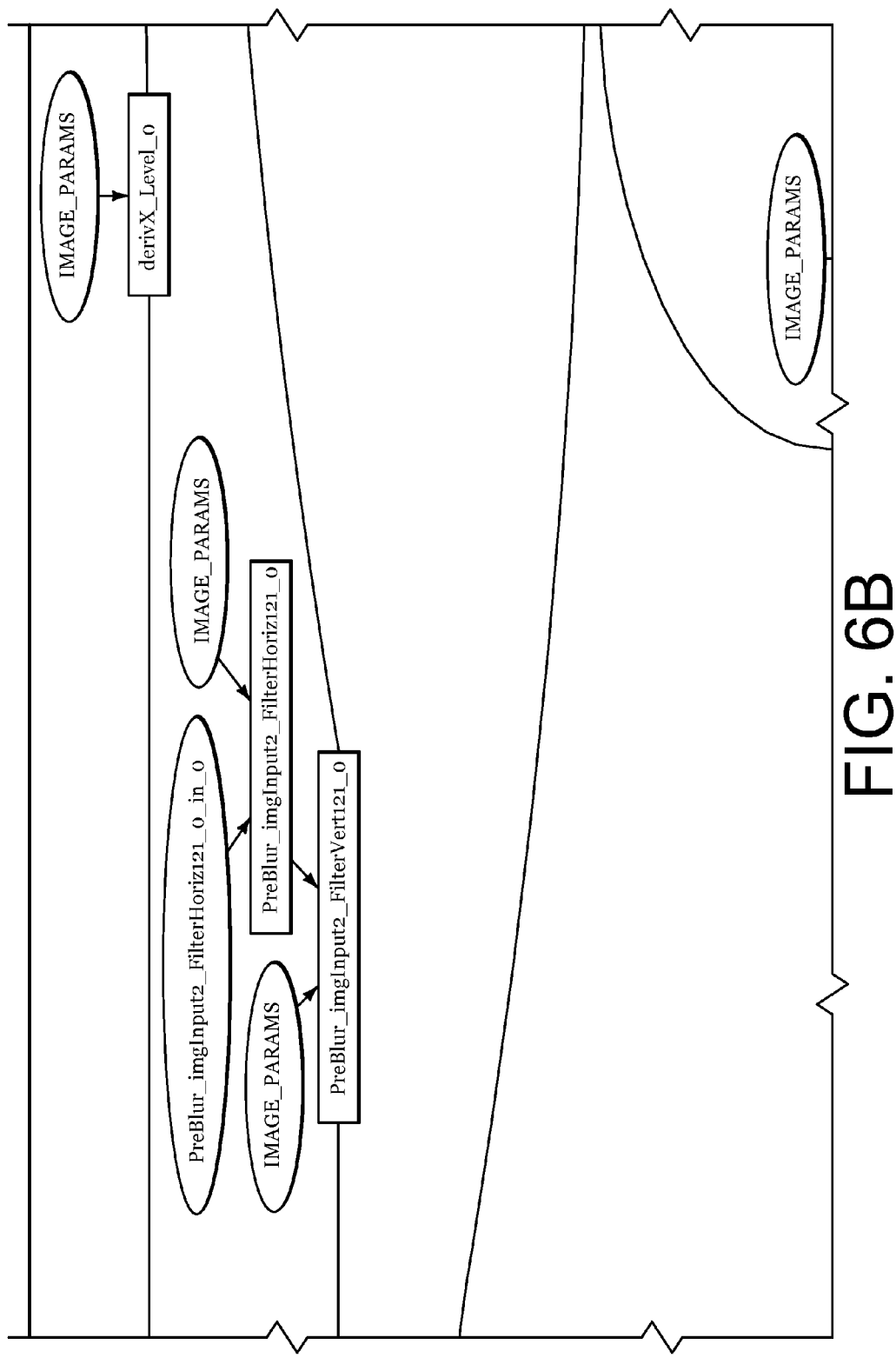
Figure 6C:
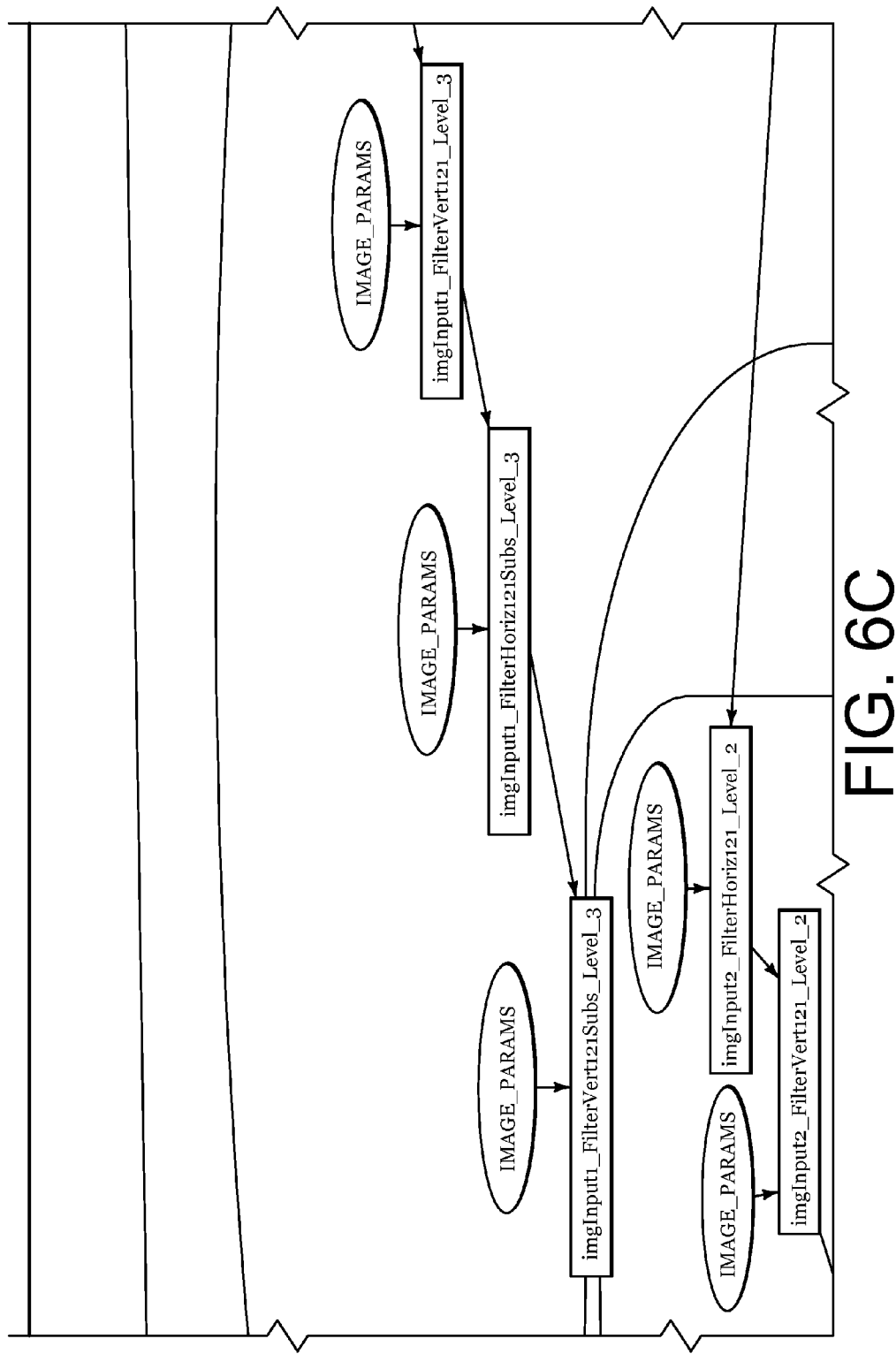
Figure 6D:
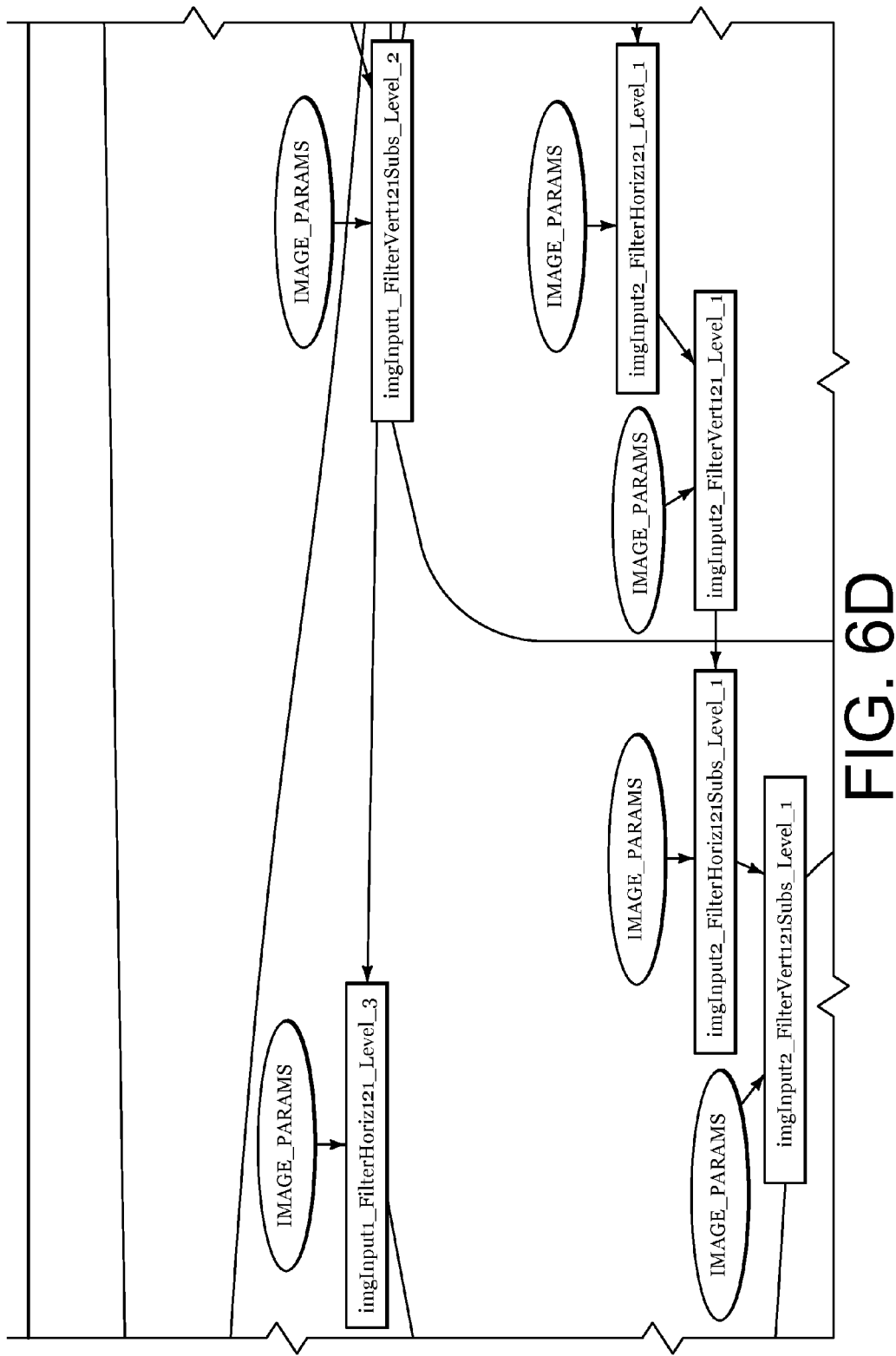
Figure 6E:
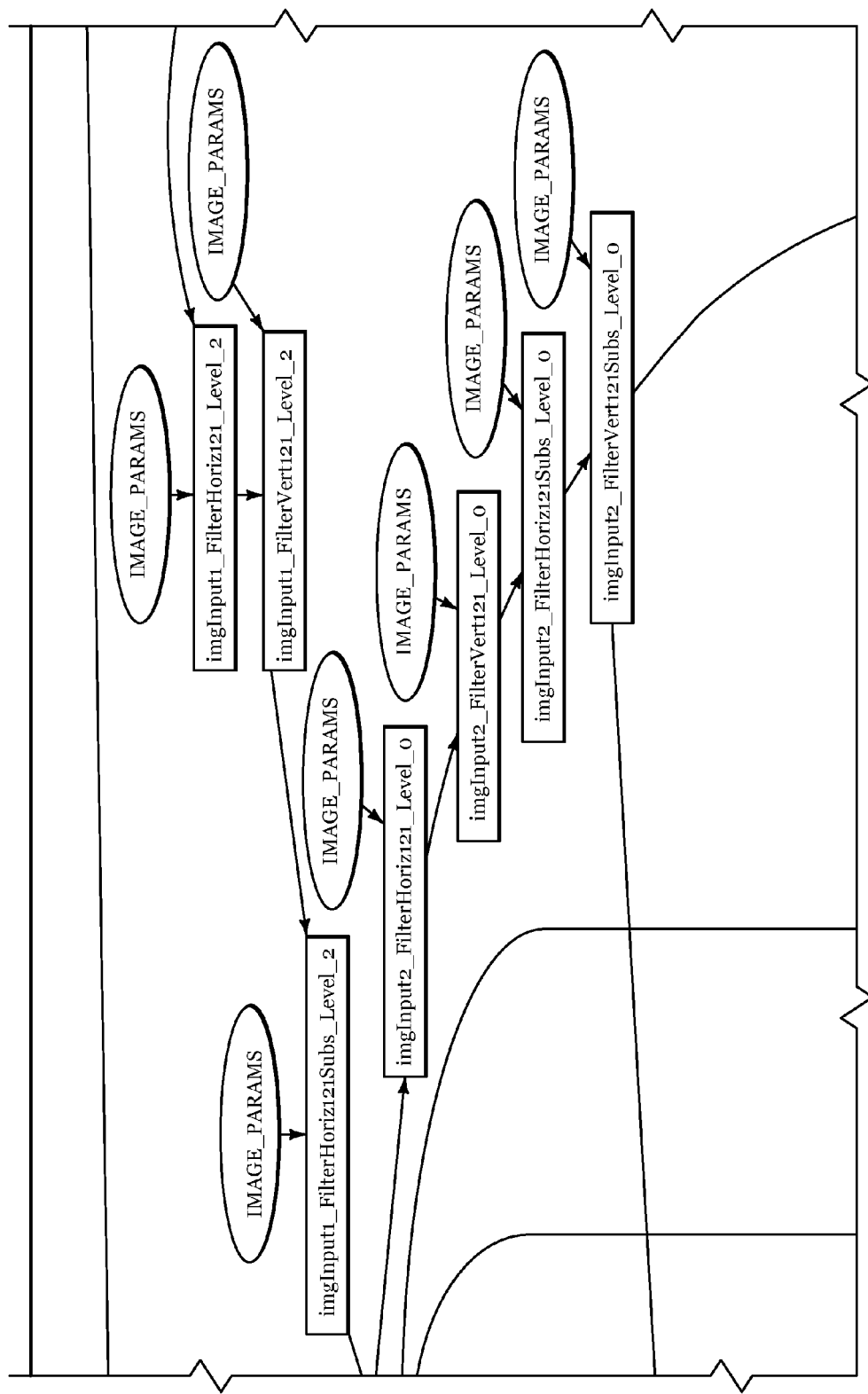
Figure 6F:
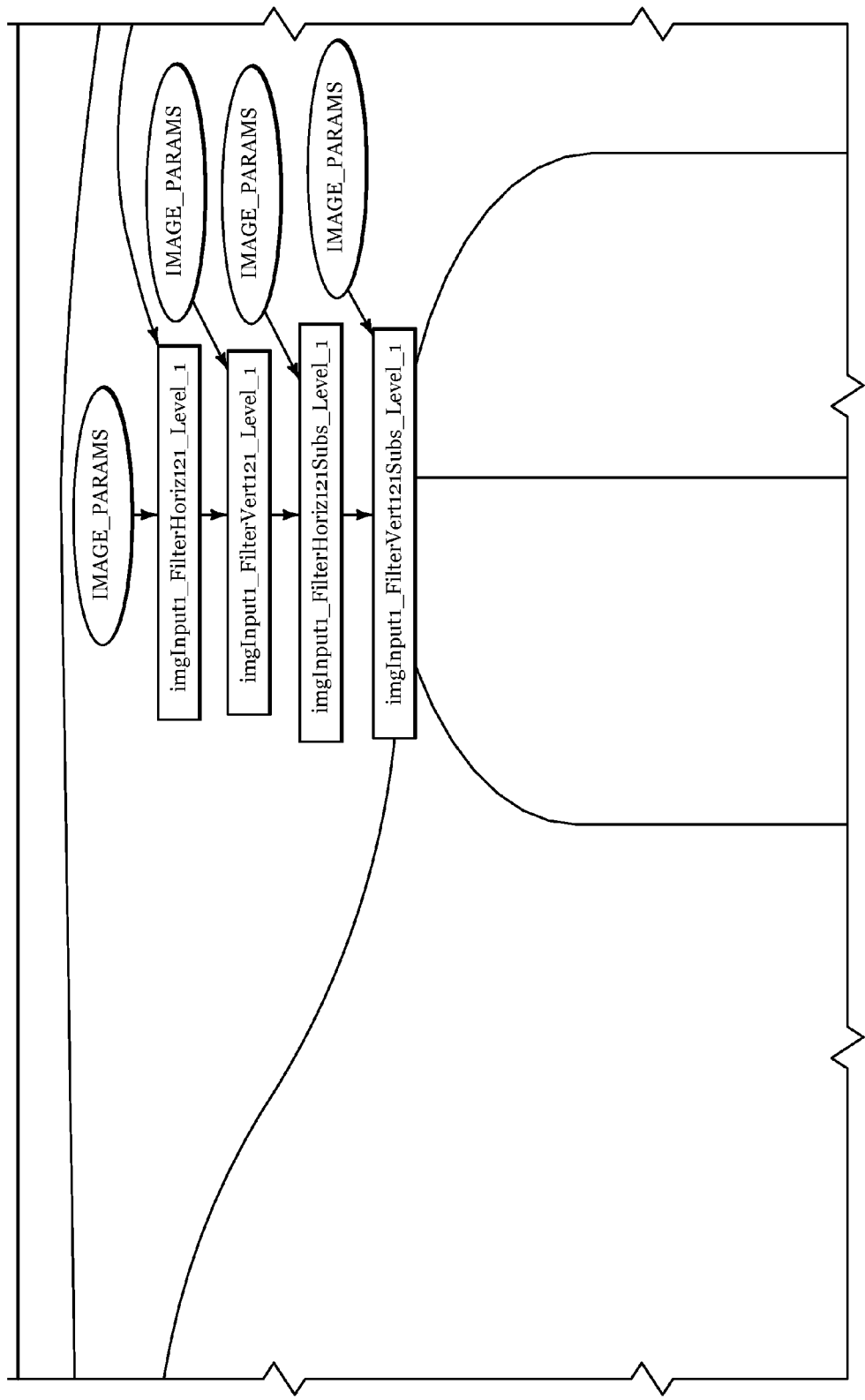
Figure 6G:
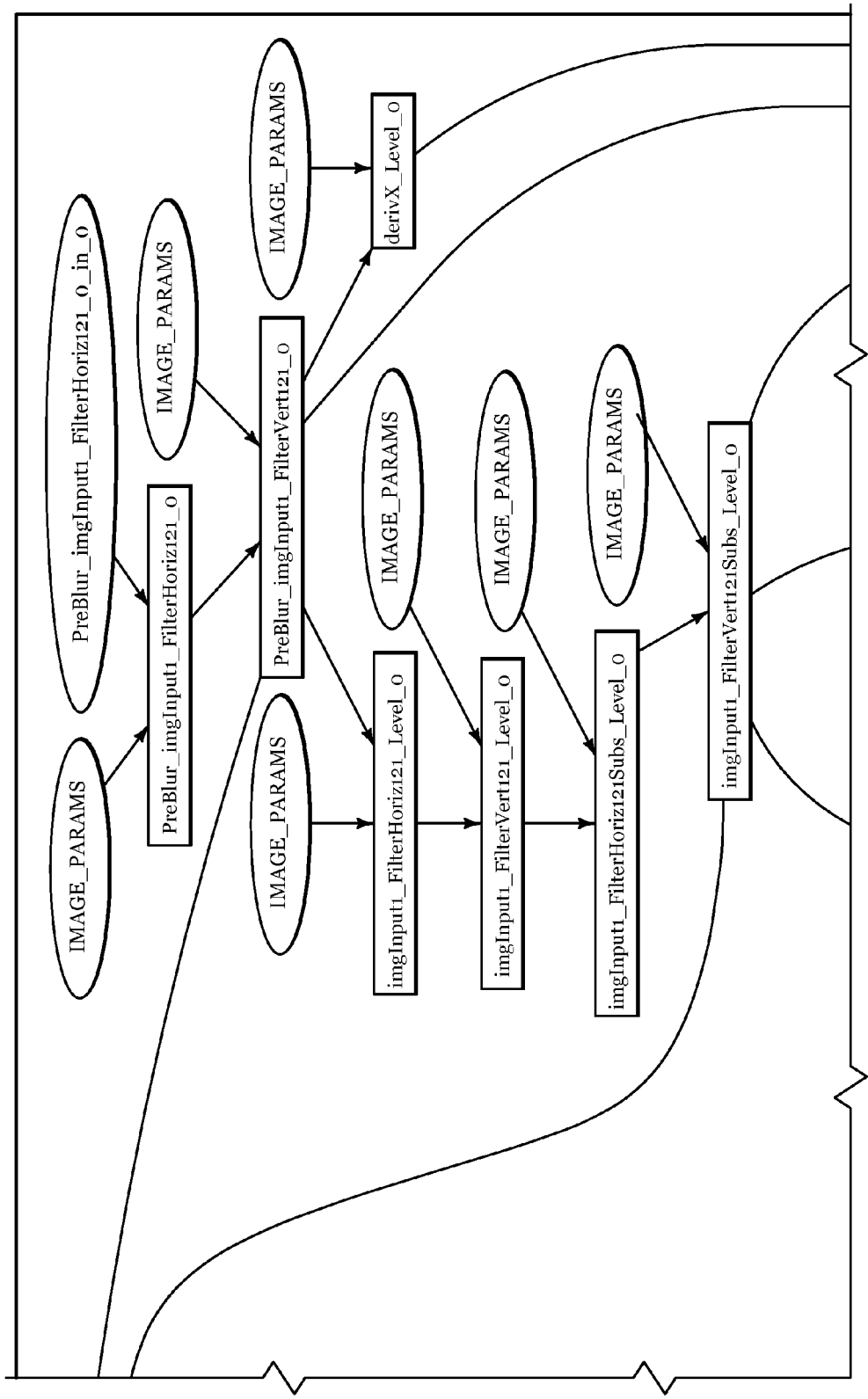
Figure 6H:
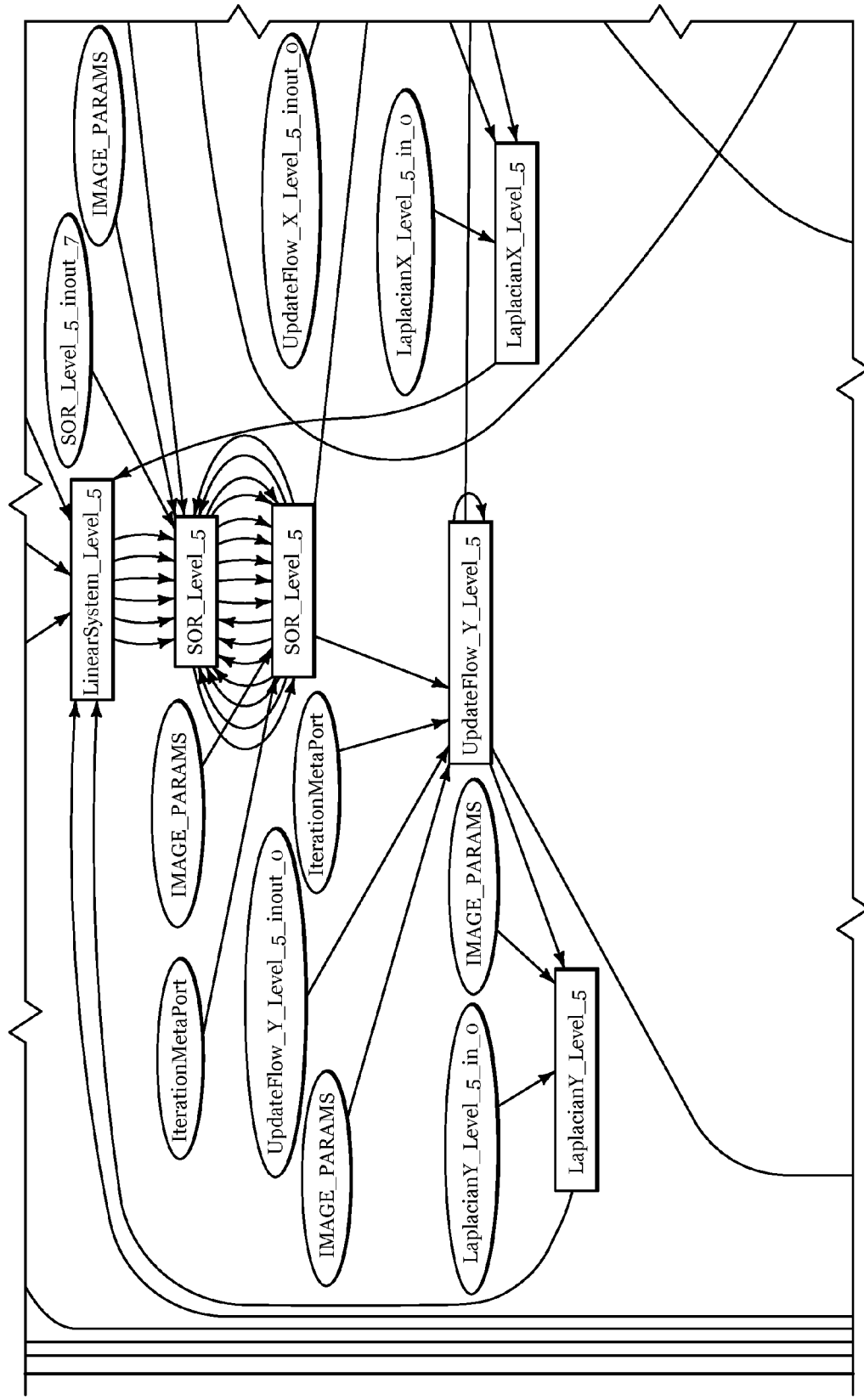
Figure 6I:
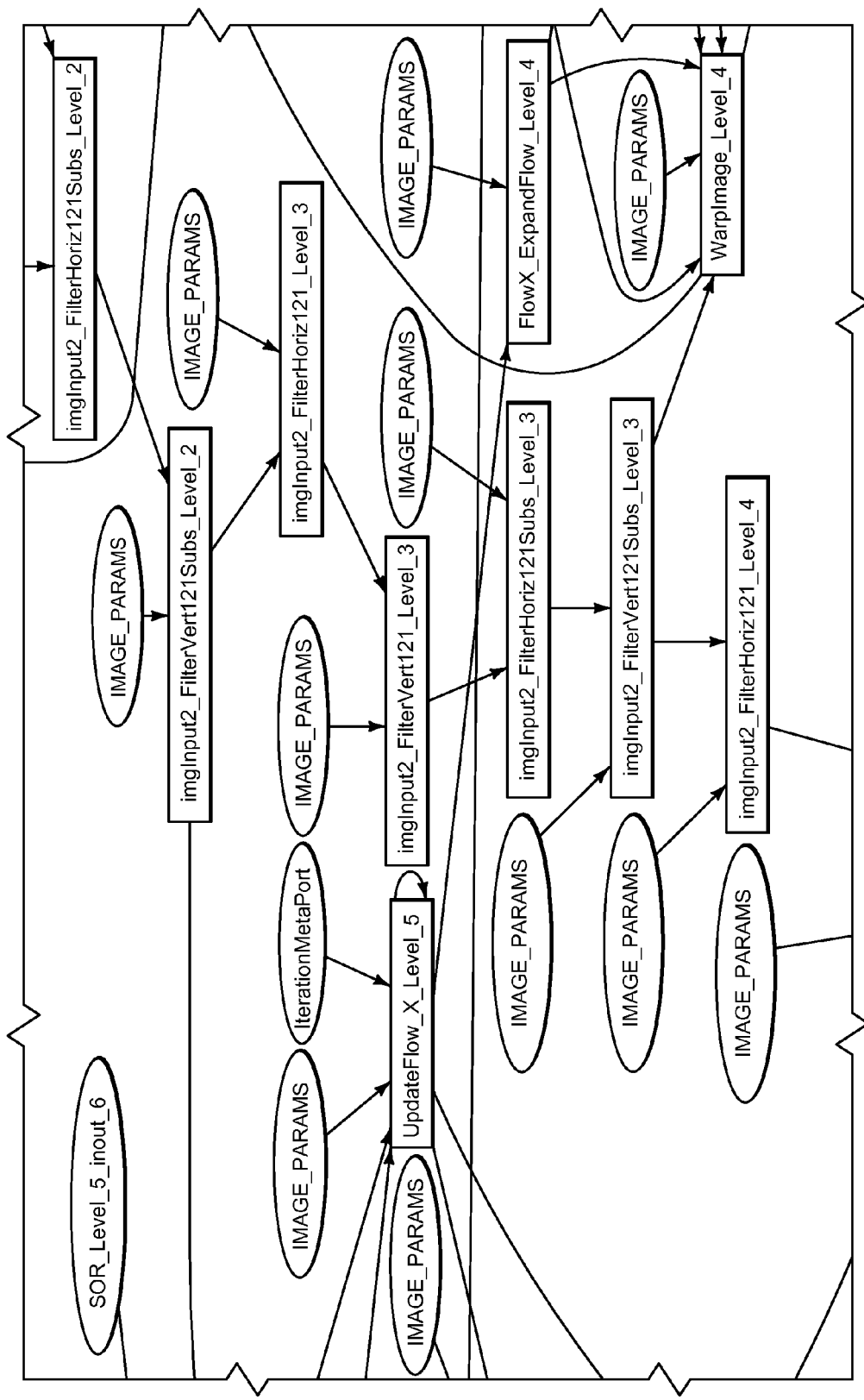
Figure 6J:
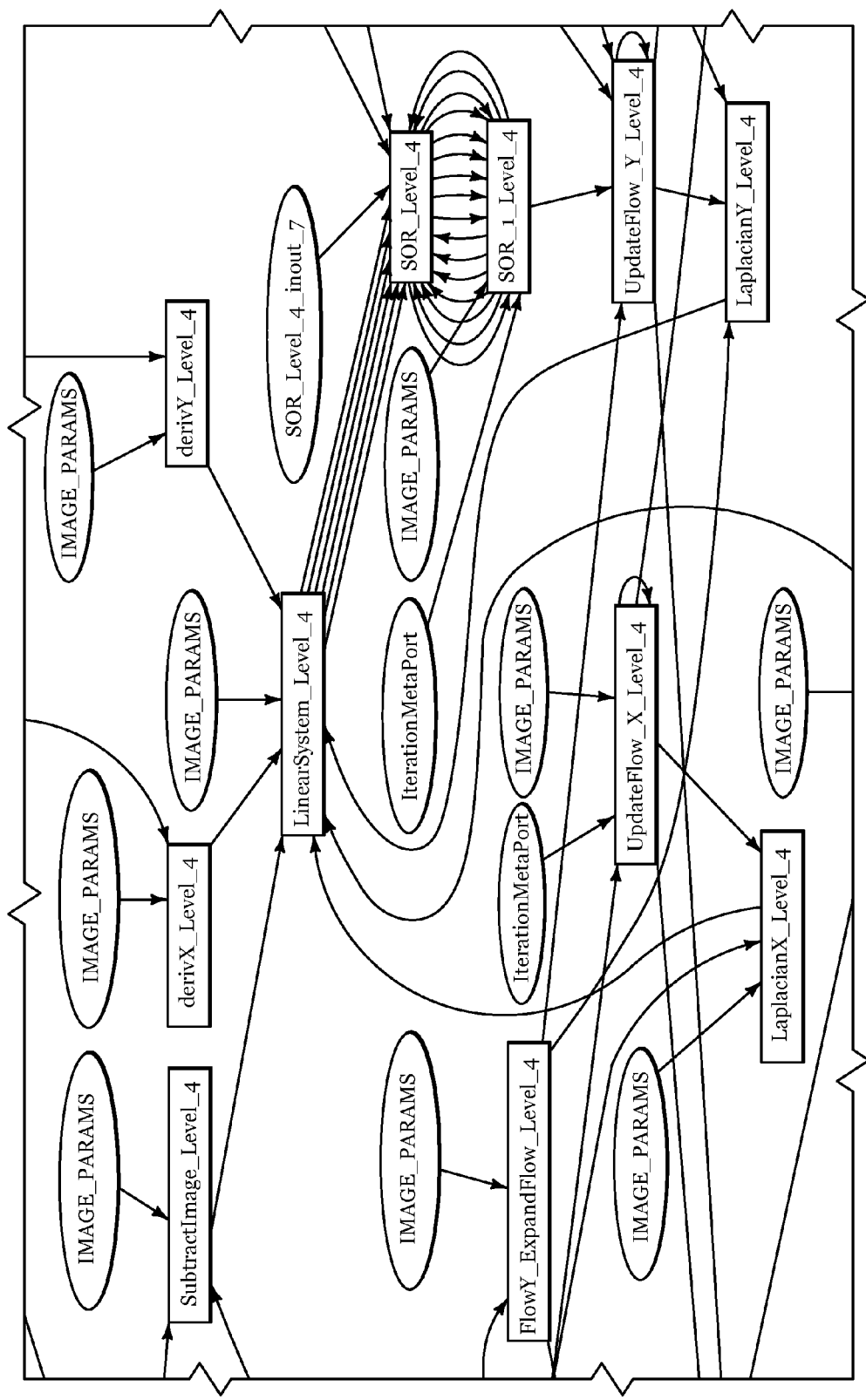
Figure 6K:
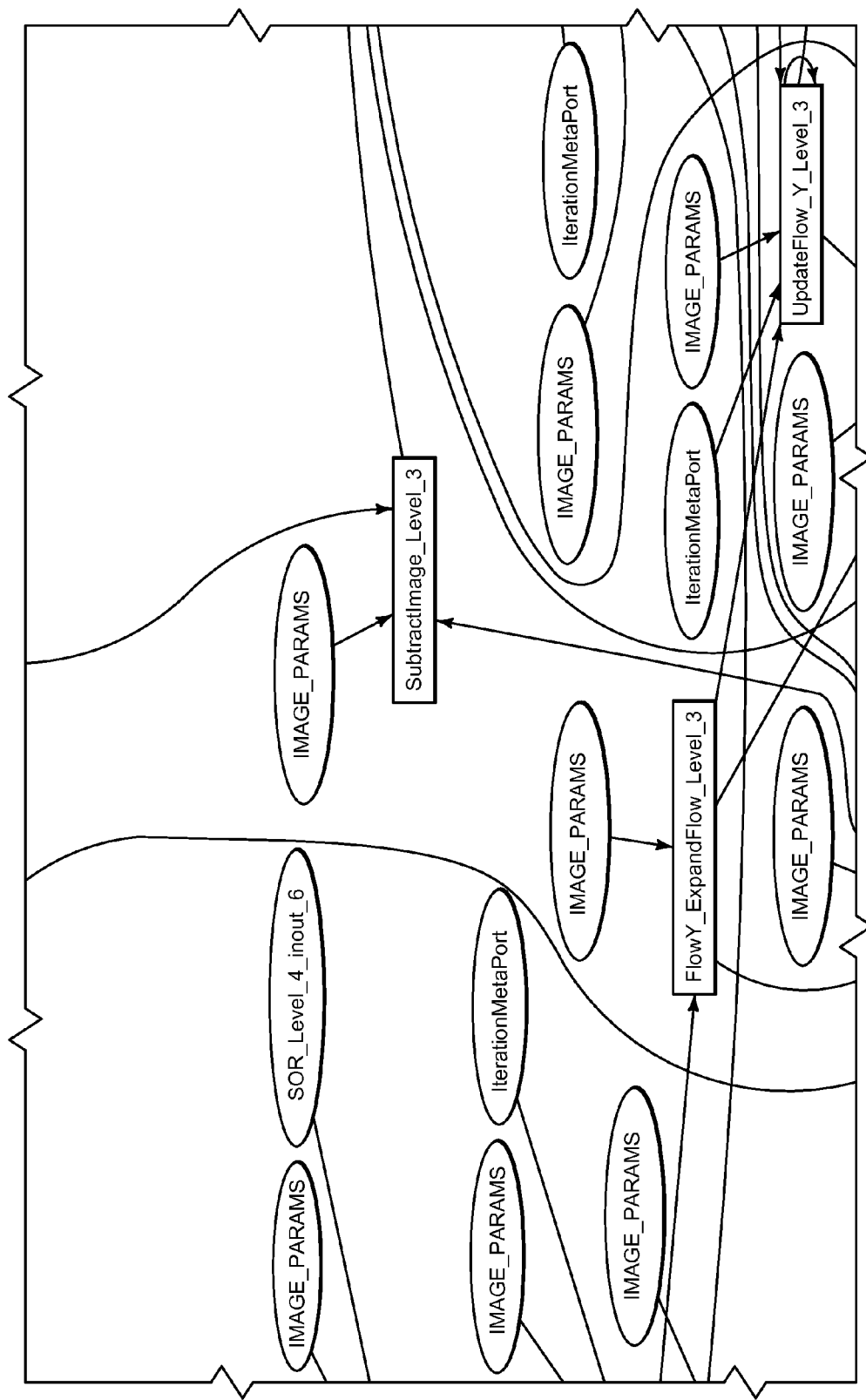
Figure 6L:
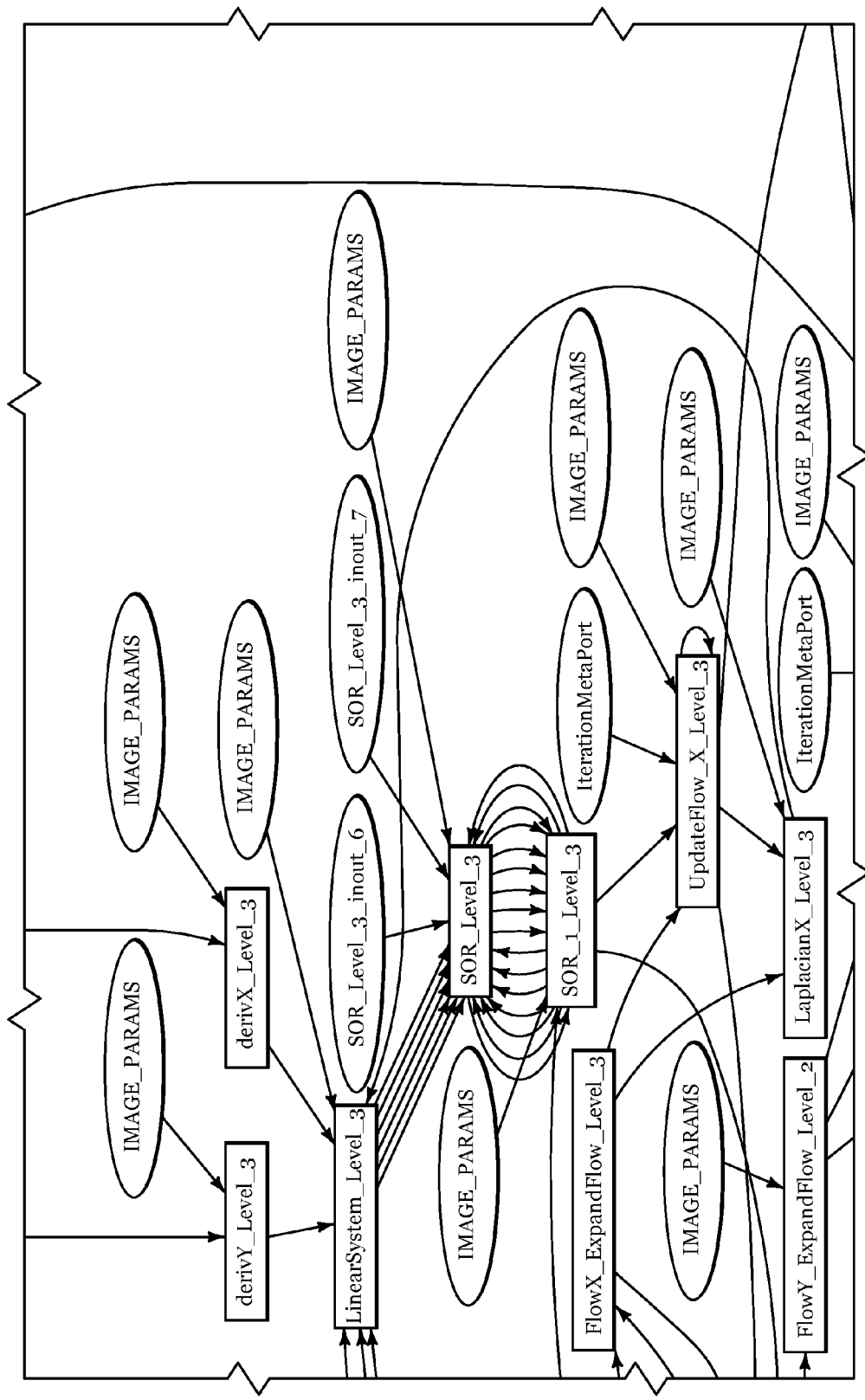
Figure 6M:
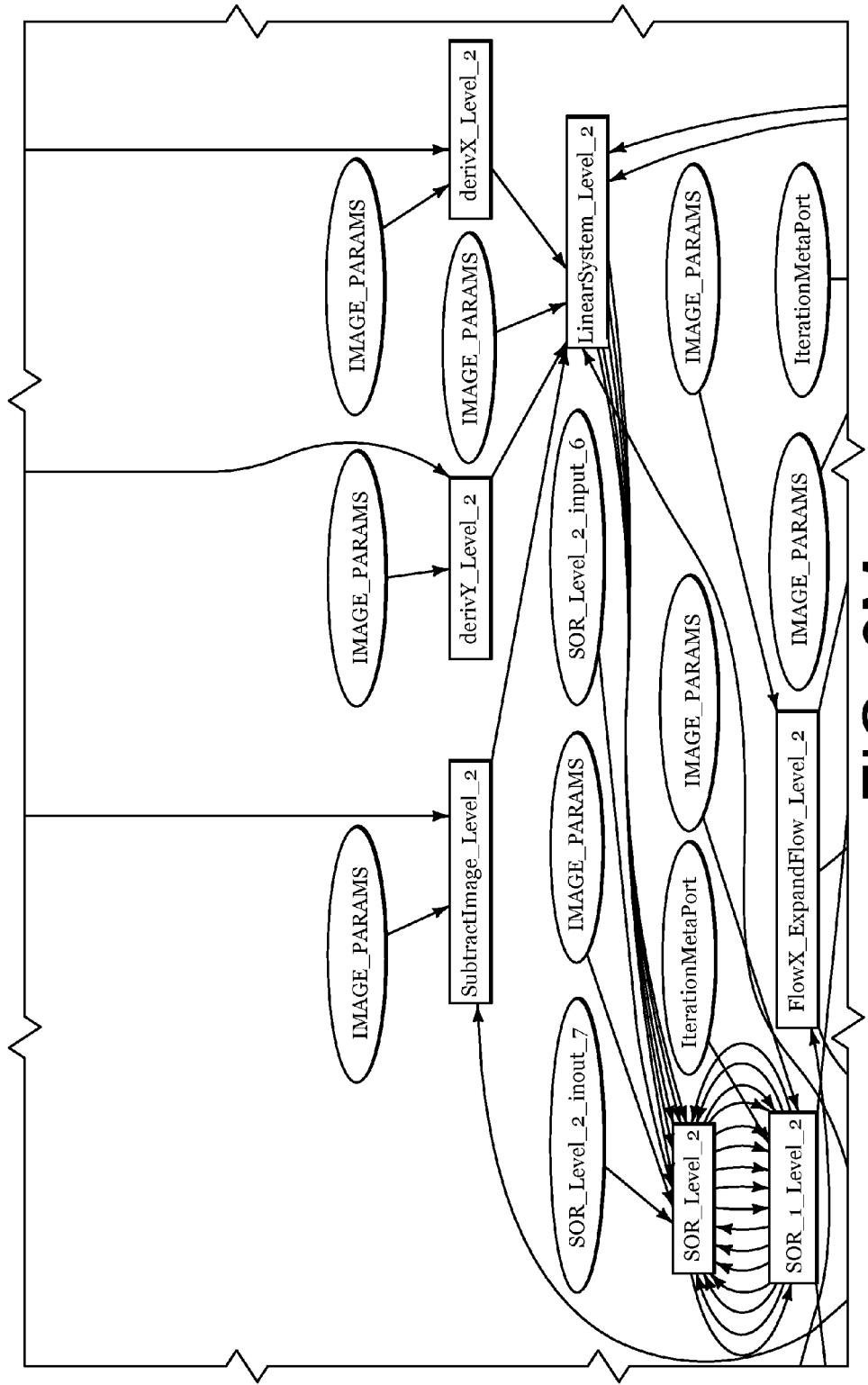
Figure 6N:
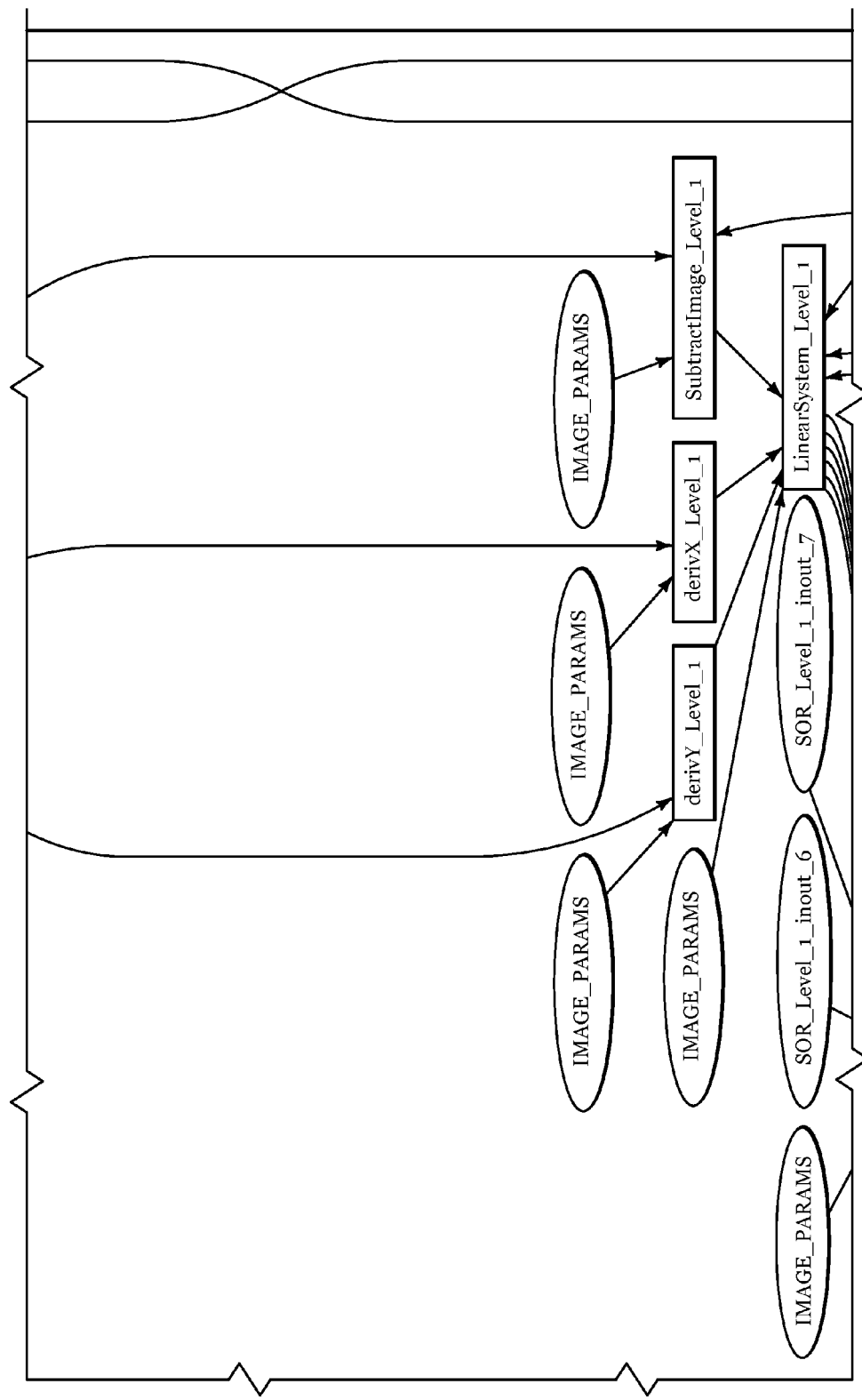
Figure 6P:
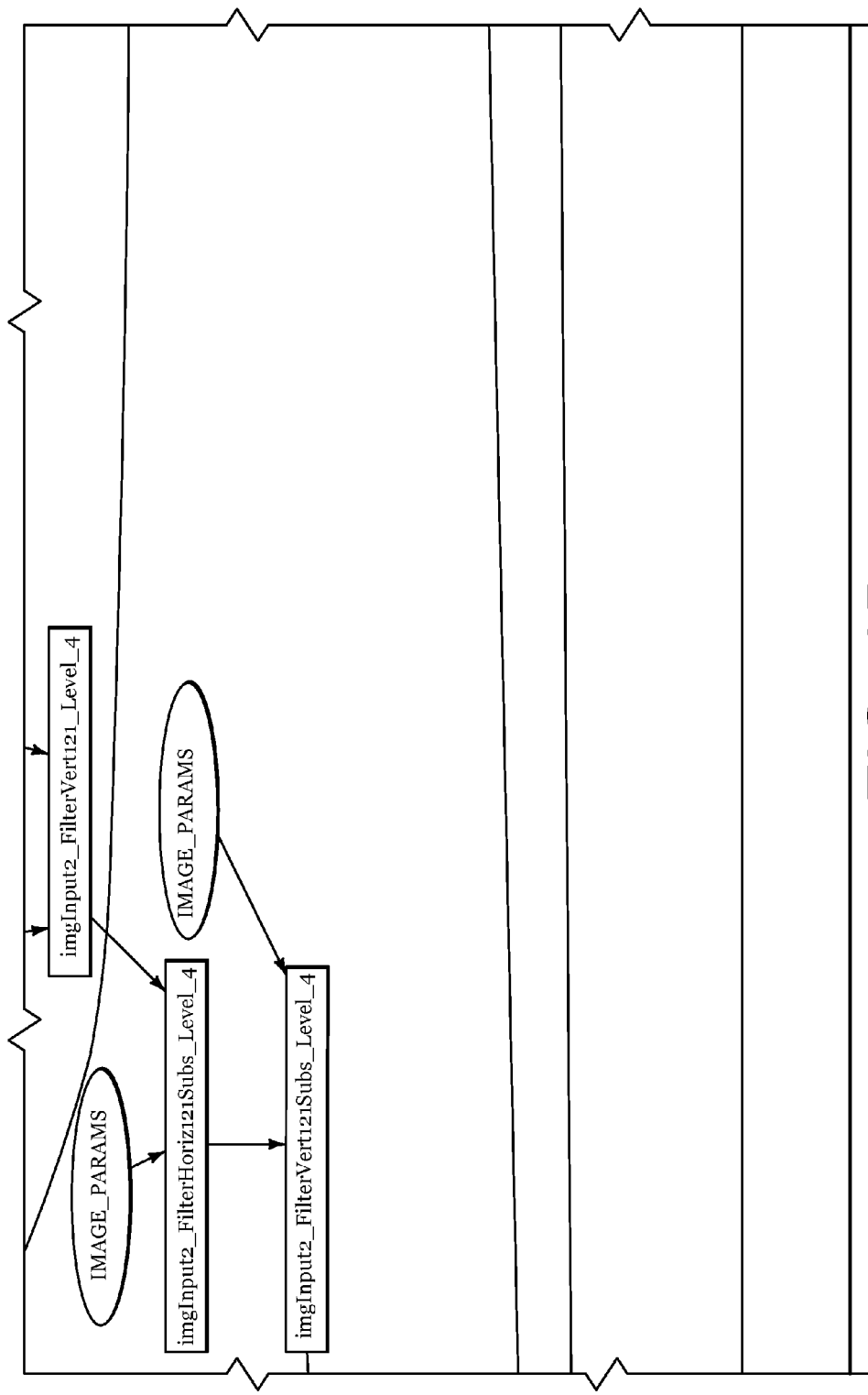
Figure 6Q:
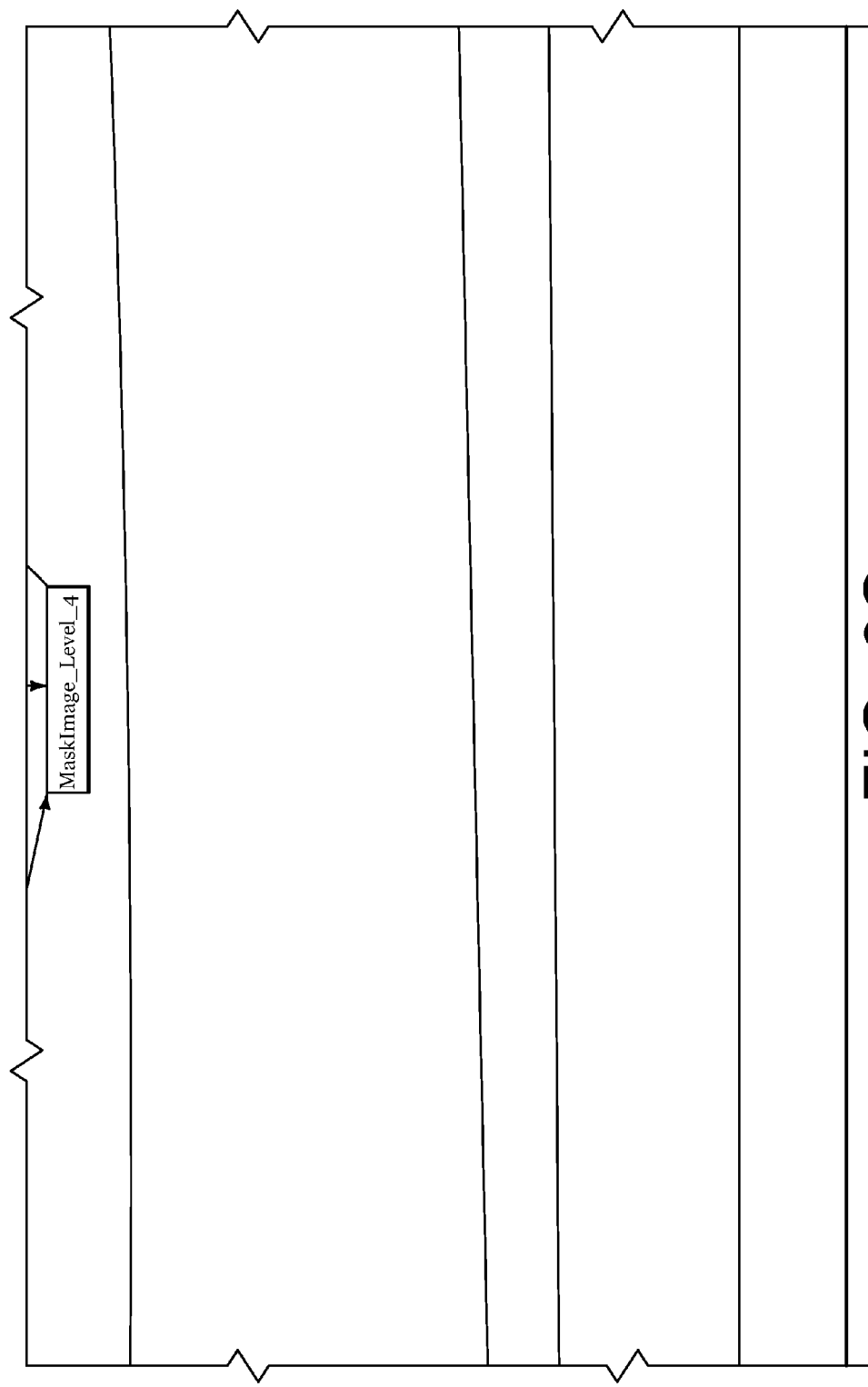
Figure 6R:
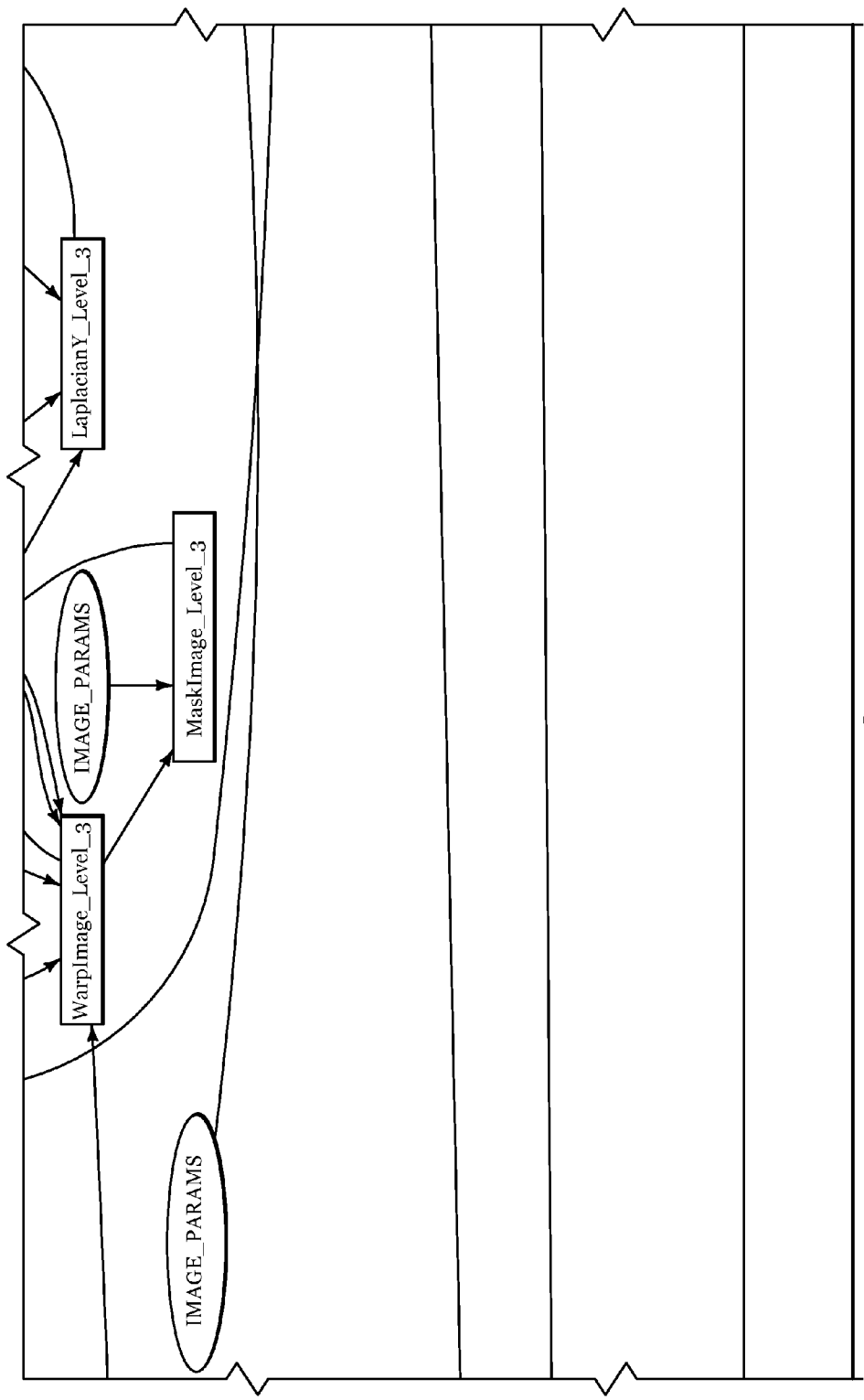
Figure 6S:
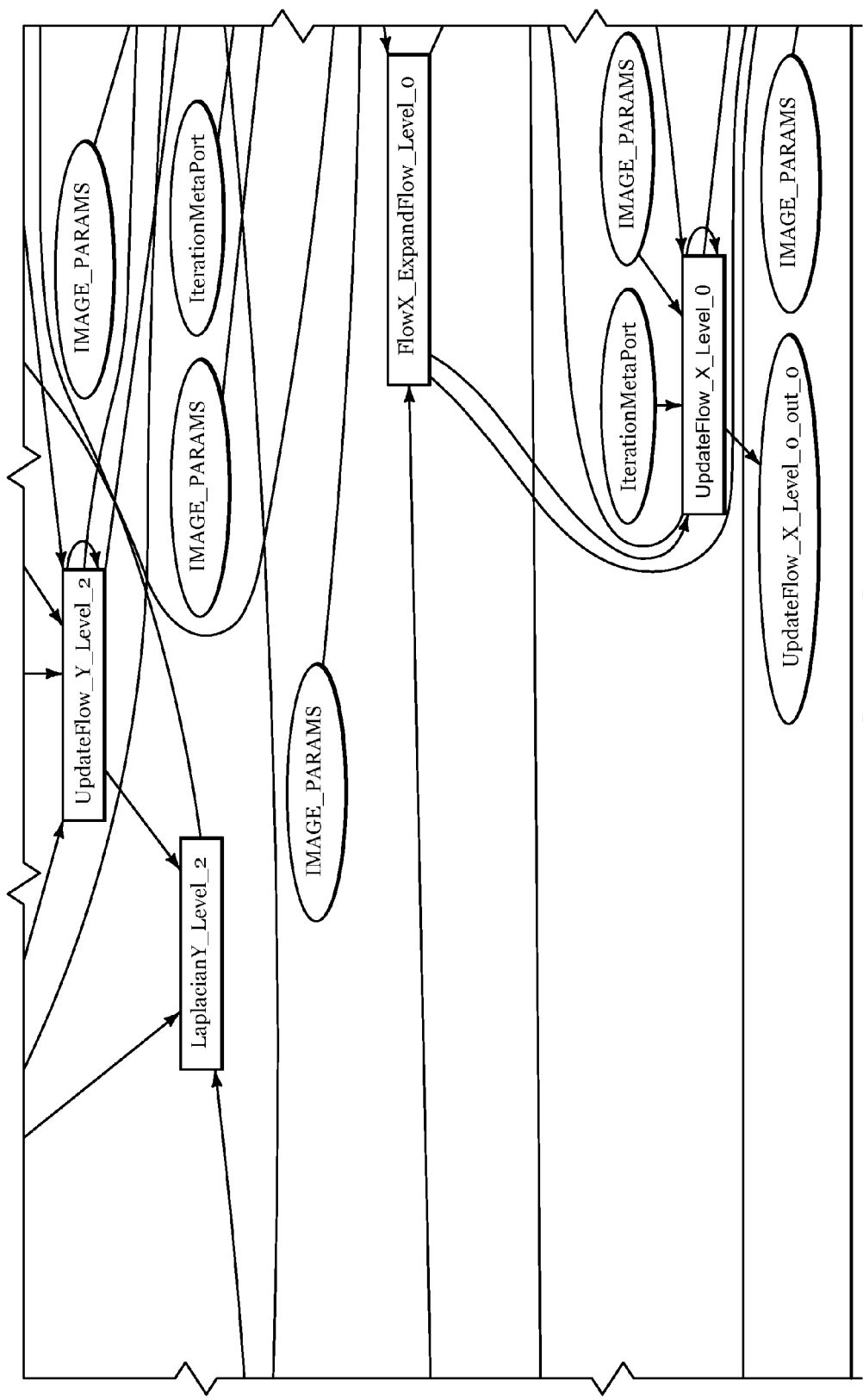
Figure 6T:
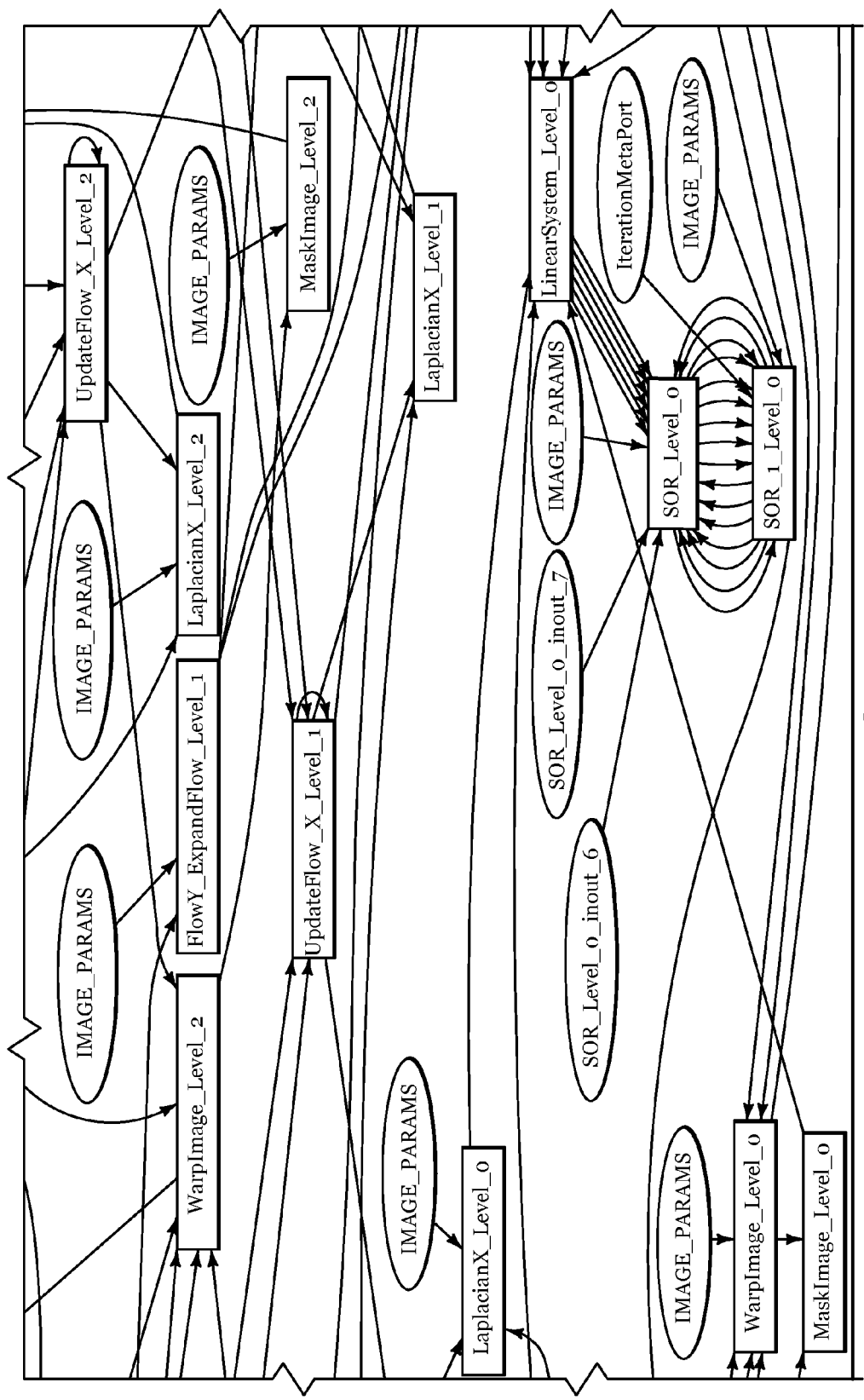
Figure 6U:
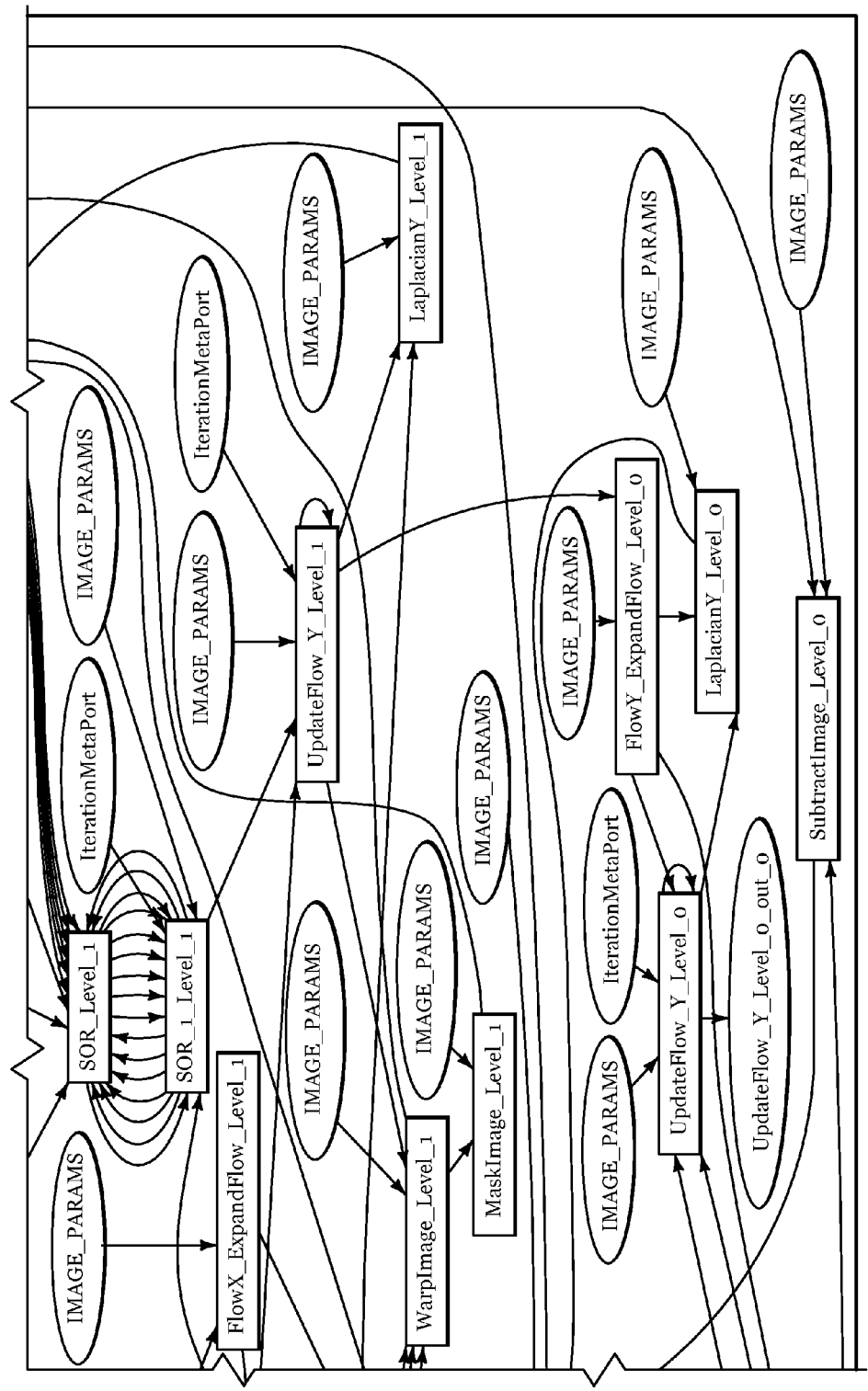

The six predicated initializer channels associated with the outer loop at each level, which have been omitted from FIG. 6U, for example, to simplify presentation, can be represented by inputs to WarpImage_Level_x (which has two, FlowX and FlowY), LaplacianX_Level_x and LaplacianY_Level_x (one each, FlowX and FlowY respectively) and UpdateFlow_X_Level_x and UpdateFlow_Y_Level_x (one each, FlowX and FlowY respectively).

The six predicated back channels associated with the outer loop at each level are represented flowing back (e.g., up from the bottom of the page) from UpdateFlow_X_Level_x ('X') and UpdateFlow_Y_Level_x ('Y') to WarpImage (two, one from X and one from Y), LaplacianX/Y (one each, from corresponding X/Y) and UpdateFlow (two, one from X and one from Y).

The two predicated channels flowing to the next pyramid level are the ones e.g. going UpdateFlow_X_Level_x and UpdateFlow_Y_Level_x to WarpImage_Level_(x−1) . . . e.g. from UpdateFlow_X_Level_5 and UpdateFlow_Y_Level_5 to WarpImage_Level_4.

An iteration metaport, called IterationMetaPort is associated with each of the two tasks at the end of the outer loop at each level—UpdateFlow_X_Level_x and UpdateFlow_Y_Level_x. To simplify presentation, the binding to multiports (the output ports of those tasks that have more than one channel coming out of them) is omitted from FIG. 6.

In this example implementation, the GPU kernels were implemented in DirectCompute, which demands that the number of GPU threads required to execute the kernel be fixed at the time of kernel compilation. The implementation processed a fixed number of pixels per kernel thread. Hence the illustrated implementation did not reuse a task at different levels of the image pyramid and the pyramid levels were unrolled. Each level of the pyramid adds 20 tasks to the graph, so the total graph size in the 720HD video case is 136 vertices, using six pyramid levels, and the total graph size in the 4K video case is 176 vertices using eight pyramid levels. In an alternate implementation, the pyramid levels could be implemented as a third, outer loop, which would reduce the size of the graph. Such an implementation could reuse a task at different levels of the image pyramid such that the pyramid levels need not be unrolled.

Illustrative Results

Figure 7:
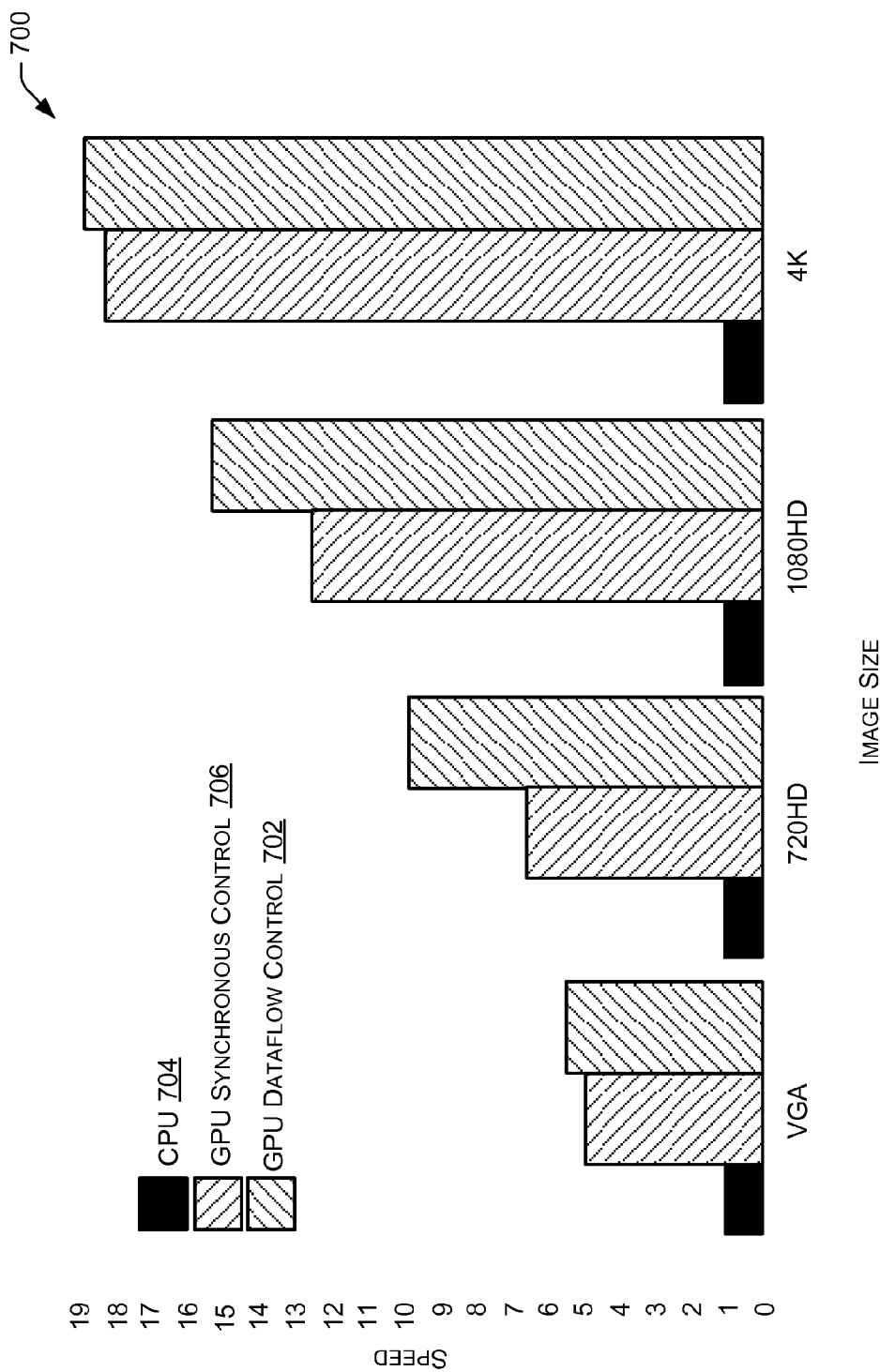
FIG. 7 illustrates a comparison of processing example image sizes with a CPU, a GPU with synchronous control, and a GPU with dataflow control including iteration support in a heterogeneous dataflow engine according to an example embodiment.

FIG. 7 illustrates a comparison of processing speed between a CPU implementation, a GPU implementation without flow control, and a GPU implementation with flow control, at different image sizes from an example implementation.

Generally, speedup is defined by $$S_p = \frac{T_1}{T_p},$$

where p represents a number of processors, $T_1$ represents execution time of a sequential algorithm, and $T_p$ represents execution time of a parallel algorithm with p processors. Meanwhile, efficiency is defined as:

$$E_p = \frac{S_p}{p} = \frac{T_1}{pT_p}.$$

An efficiency value, typically between zero and one, estimates how well-utilized the processors are, compared to an amount of waste in communication and synchronization between resources. The IDEA achieves greater efficiency, and hence greater speedup, by allocating dataflow to well-suited resources including processors and accelerators according to tasks and predicates present in an algorithm.

FIG. 7 at 700 shows an evaluation of the implementation of optical flow as shown in FIG. 6, as illustrated by the pattern 702. The evaluation was performed by comparing the performance of the implementation of optical flow against a sequential CPU only implementation, as illustrated by the pattern 704, and a GPU-based implementation that uses the same GPU kernels and a sequential driver program with synchronous control flow, as illustrated by the pattern 706.

Measurements were taken on a Windows 7 x64 machine with a 2.67 GHz 4-core INTEL XEON (W3520) with 12 GB RAM, and an NVIDIA GTX 580 GPU (512 cores, 3 GB memory). Measurements were compared for input image sequences of various dimensions, representing common video sizes: VGA (640×480), 720HD (1240×720), 1080HD (1920×1080) and 4K 'Ultra HD' (4096×2160).

FIG. 7 illustrates speedup over the CPU implementation for 3 and 5 outer and inner iterations at each level of the pyramid, respectively, using the average data over 5 runs. Results for other iteration counts were similar. Both GPU-based implementations 702 and 706 outperform the CPU-based implementation 704, by a margin that increases with image size. As illustrated, the IDEA-based implementation 702 also consistently outperformed the synchronous control GPU implementation 706.

As illustrated, the relative performance of the IDEA peaked for 720HD and 1080HD video (32% and 17% speedup, respectively). The IDEA performed comparatively better on 720HD and 1080HD because setup and communication costs were dominant at the smaller image size, i.e., only 7% for VGA, and GPU execution latency dominated at 4K Ultra HD, i.e., 2%. The asynchrony in the IDEA dataflow system provides these benefits; without control flow constructs as described herein, the workload could not be coded as dataflow.

Illustrative Processes

Figure 8:
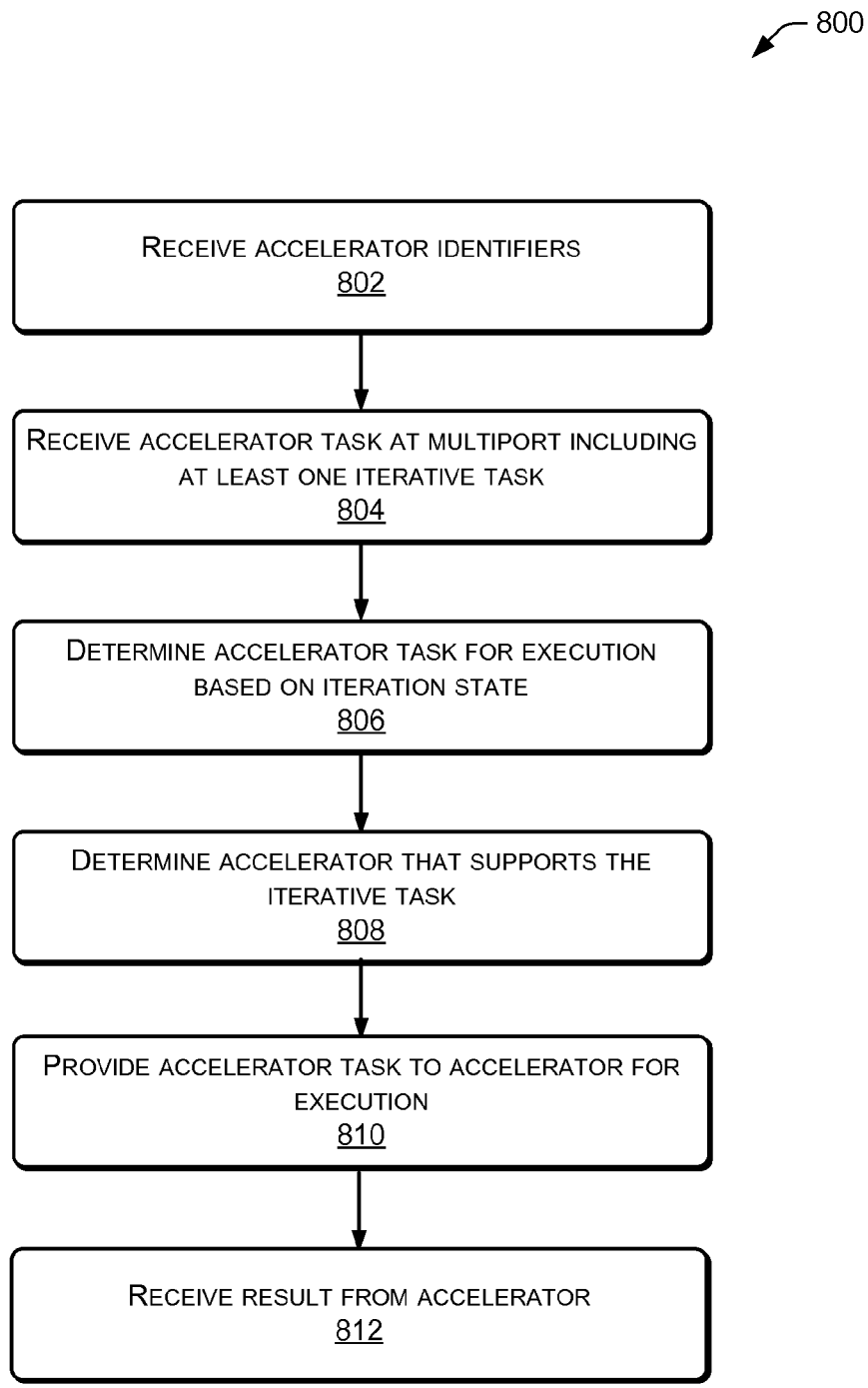
FIG. 8 is a flowchart illustrating an example process for iteration support in a heterogeneous dataflow engine, according to various embodiments.
Figure 9:
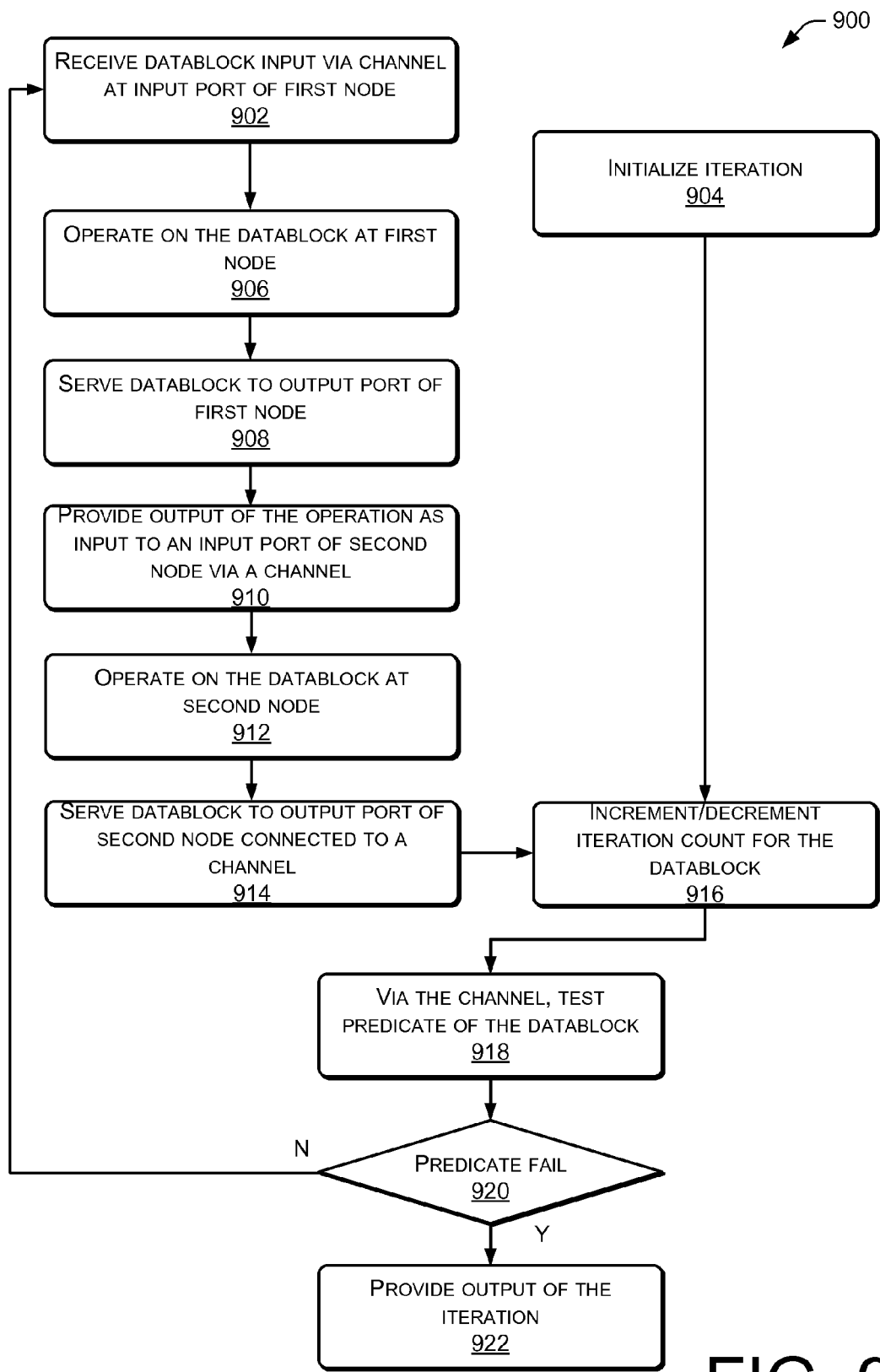
FIG. 9 is a flowchart illustrating an example process for iteration support in a heterogeneous dataflow engine, according to various embodiments.

FIGS. 8 and 9 are flow diagrams depicting example processes for iteration support in a heterogeneous dataflow engine. The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes.

In the example shown in FIG. 8, process 800 is performed by the IDEA operating on a dataflow graph. Process 800 can be performed by resources associated with one or more device(s) 106 such as one or more internal or external CPUs 108 or 114, or GPUs 116, and one or more pieces of hardware logic such as FPGAs, DSPs, or other types of accelerators 118.

At 802, a computing device such as device 106, receives identifiers of resources associated with the device that may operate as accelerators for processing. for example, device 106 may receive identifiers from processors and/or accelerators that are part of the device 106, such as processing unit 108, as well as processors and/or accelerators that are external to device 106 such as processors 114 and 116 as well as accelerators 118.

At 804, the computing device such as device 106, receives one or more accelerator tasks at multiport including at least one iterative computation. In some embodiments, the one or more accelerator tasks may have an affinity towards one or more of the accelerators.

At 806, the computing device, determines an accelerator task from the one or more accelerator tasks that is ready for execution based at least on an iteration state.

At 808, the computing device, determines from the plurality of accelerators, one or more accelerators from the identified available accelerators that support the iterative computation that is ready for execution.

At 810, the computing device, provides the accelerator task that is ready for execution to one of the determined one or more accelerators. In some embodiments, when the accelerator task that is ready for execution includes the iterative computation, this includes providing the iterative computation to a determined accelerator that supports the iterative computation.

At 812, the computing device, receives at least one result from the one of the one or more determined accelerators.

In the example shown in FIG. 9, process 900 includes operations performed by nodes and edges associated with one or more device(s) 106.

At 902, a first node receives input of a datablock via a channel at an input port, such as a channel that feeds a multiport of the first node.

At 904, the system initializes an iteration. For example, an iteration initializer, such as iteration initializer 534 can push an iteration state datablock into an iterator port such as iterator port 514.

At 906, the first node operates on the datablock. For example, the node may execute a first operation of application level programming on the datablock.

At 908, the first node provides output of the operation to an output port associated with the first node.

At 910, the output port associated with the first node provides output of the operation at the first node to an input port of a second node via a channel.

At 912, the second node operates on the datablock. For example, the node may execute a second operation of application level programming on the datablock.

At 914, the second node provides output of the operation to an output port associated with the second node connected to a channel.

At 916, an iterator port increments or decrements iteration count for the datablock according to the control flow of the channel.

At 918, the channel tests the predicate or control flow for conditional data movement. For example, according to a control signal on the datablock, the channel may evaluate a predicate such as comparing the iteration count to a number of times the datablock is set to iterate on the loop, or whether a condition has been met.

At 920, the datablock passes or fails the test. If the datablock fails, the datablock having been iterated once, proceeds on a back-channel to 902; if the datablock passes the test, the datablock is provided as output of the iteration at 922.

Conclusion

Although the techniques have been described in language specific to structural features and/or methodological acts, it is to be understood that the appended claims are not necessarily limited to the features or acts described. Rather, the features and acts are described as example implementations of such techniques.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain embodiments include, while other embodiments do not include, certain features, elements and/or steps. Thus, such conditional language is not generally intended to imply that certain features, elements and/or steps are in any way required for one or more embodiments or that one or more embodiments necessarily include logic for deciding, with or without user input or prompting, whether certain features, elements and/or steps are included or are to be performed in any particular embodiment.

Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   at least one computing device, the computing device comprising at least one processor and a computer readable media operably connected to the at least one processor;
   an accelerator associated with the at least one computing device; and
   an application programming interface (API) stored in the computer readable media and executed by the at least one processor to expose the accelerator for iterative dataflow, wherein iterative dataflow is controlled based at least on an iteration state representing a loop count or a predicate of a computation, the API including:
   a multiport configured to:
      accept datablocks as input from a plurality of input channels; and
      dequeue a datablock from the datablocks from an input channel of the plurality of input channels;
   an iterator port configured to:
      maintain the iteration state of the computation associated with the datablock that was dequeued; and
      propagate control signals when an iteration begins or ends;
   a scheduler configured to provide the datablock that was dequeued to the accelerator based at least on the iteration state, wherein the datablock that was dequeued includes a control code defining the control signals to control when the iteration begins or ends; and
   a module to specify a control-propagation pair that controls propagation of the control code received at a first port to a second port.

2. A system as claim 1 recites, wherein each input channel of the plurality of input channels has an assigned priority and the datablock is dequeued from the input channel of the plurality of input channels based, at least in part, on the assigned priorities of the input channels.

3. A system as claim 1 recites, further comprising a predicated channel module configured to evaluate a predicate, wherein the predicate includes a data-dependent criterion.

4. A system as claim 3 recites, wherein the predicated channel module is further configured for backward-forward passing.

5. A system as claim 1 recites, further comprising an initializer channel module configured to provide an initial value datablock to initiate the iteration.

6. A method comprising:
   receiving identifiers of a plurality of accelerators associated with a computing device, the plurality of accelerators being available to perform accelerator tasks;
   receiving a plurality of accelerator tasks at a multiport of the computing device, wherein an accelerator task has an affinity towards one or more of the plurality of accelerators and wherein the plurality of accelerator tasks include an iterative computation;
   determining, by the computing device, an accelerator task from the plurality of accelerator tasks that is ready for execution based at least on an iteration state;
   determining from the plurality of accelerators, a particular accelerator that supports the iterative computation that is ready for execution;
   providing, by the computing device and to the particular accelerator, the accelerator task that is ready for execution, wherein, when the accelerator task that is ready for execution includes the iterative computation, the providing includes:
      providing the iterative computation to the particular accelerator;
      providing, to the particular accelerator, a datablock that includes a control code, wherein the control code defines propagating control signals to control when an iteration begins or ends; and
      providing, to the particular accelerator, a control-propagation pair that controls propagation of the control code, received by the particular accelerator at a first port, to a second port; and
   receiving, by the computing device, at least one result from the particular accelerator.

7. A method as claim 6 recites, wherein the particular accelerator supports the iterative computation for a data-dependent termination criterion.

8. A method as claim 6 recites, wherein the plurality of accelerator tasks are represented by a graph with a node corresponding to each accelerator task, and the iterative computation is represented by a sub-graph with at least one edge corresponding to a dataflow according to iteration of the sub-graph.

9. A method as claim 8 recites, wherein the particular accelerator supports the iterative computation without repeating iteration of the sub-graph for each iteration.

10. A method as claim 6 recites, further comprising, representing the plurality of accelerator tasks in a graph including a plurality of nodes and a plurality of edges, wherein a node of the plurality of nodes corresponds to the accelerator task that is ready for execution and an edge of the plurality of edges corresponds to a channel that connects two nodes of the plurality of nodes to carry a flow of data as a plurality of datablocks between two of the plurality of accelerator tasks.

11. A method as claim 6 recites, wherein the particular accelerator supports the iterative computation without unrolling a loop representing the iterative computation.

12. A method as claim 6 recites, further comprising evaluating a predicate, wherein the predicate includes a data-dependent criterion.

13. One or more computer storage media having computer-executable instructions recorded thereon, the computer-executable instructions, upon execution, to configure a computer for iterative dataflow with modules comprising:
 a graph module configured to represent a plurality of accelerator tasks in a graph including a plurality of nodes and a plurality of edges, wherein a node of the plurality of nodes corresponds to an accelerator task and an edge of the plurality of edges corresponds to a particular channel from a plurality of channels, wherein the particular channel connects two nodes of the plurality of nodes to carry a flow of data as a plurality of datablocks between two of the plurality of accelerator tasks;
 a multiport module configured with connections for the plurality of channels in which the plurality of datablocks are queued for input to a multiport, the multiport module further configured to dequeue an available datablock of the plurality of datablocks according to an assigned priority of the channel in which the available datablock is queued for input to the multiport;
 an iterator port module configured to maintain an iteration state; and
 a control signal module configured to annotate at least one datablock of the plurality of datablocks with a control code to control the flow of the data between memories of accelerators for performance on the data of respective accelerator tasks of the plurality of accelerator tasks by indicating the channel in which the at least one datablock of the plurality of datablocks is to be queued.

14. One or more computer storage media as claim 13 recites, wherein the iterator port module is further configured to maintain a list of ports within a scope of the iterator port module, and to signal the ports on the list of ports of a change to the iteration state.

15. One or more computer storage media as claim 13 recites, wherein the iterator port module is further configured to propagate control signals along control propagation paths.

16. One or more computer storage media as claim 15 recites, further comprising a predicated channel module configured to evaluate a predicate, wherein the predicate includes a data-dependent criterion, and when the predicated channel module is further configured for backward-forward passing, a combination of the iterator port module and the predicated channel module are configured to conditionally route data to one of:
 backward to a beginning of another iteration, or
 forward in the graph when a loop completes.

17. One or more computer storage media as claim 13 recites, wherein the iterator port module is further configured to propagate control signals according to the control code when iteration begins or ends.

18. One or more computer storage media as claim 13 recites, further comprising an initializer channel module configured to provide an initial value datablock to initiate an iteration.

19. One or more computer storage media as claim 13 recites, further comprising a predicated channel module configured to evaluate a predicate, wherein the predicate includes a data-dependent criterion.

20. One or more computer storage media as claim 19 recites, wherein the predicated channel module is further configured to:
 pass the available datablock through a predicated channel to a connected node when the predicate holds for the available datablock, and
 when the predicate does not hold for the available datablock, cause an action including one of dropping the available datablock from the predicated channel or queuing the available datablock for re-evaluation.

* * * * *